(12) United States Patent
Apps

(10) Patent No.: US 8,100,273 B2
(45) Date of Patent: Jan. 24, 2012

(54) RACK FOR CONTAINERS

(75) Inventor: William P. Apps, Alpharetta, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 1240 days.

(21) Appl. No.: 11/389,949

(22) Filed: Mar. 27, 2006

(65) Prior Publication Data

US 2007/0221593 A1 Sep. 27, 2007

(51) Int. Cl.
*A47B 73/00* (2006.01)
(52) U.S. Cl. .......................................................... 211/74
(58) Field of Classification Search .................... 211/74, 211/49.1; 206/139, 446, 372; D7/704; 248/311.2; 414/276
See application file for complete search history.

(56) References Cited

U.S. PATENT DOCUMENTS

| | | | |
|---|---|---|---|
| 943,970 A | 12/1909 | Goldenetz | |
| 966,008 A | 8/1910 | Goldman | |
| 1,450,084 A | 3/1923 | Hull | |
| 2,278,232 A | 3/1942 | Anderson | |
| 2,325,863 A | 8/1943 | Johnson | |
| 2,445,423 A | 7/1948 | Eastman | |
| 2,452,195 A * | 10/1948 | Johnson | 215/12.1 |
| 2,525,551 A | 10/1950 | Keith | |
| 2,619,234 A | 11/1952 | Stone | |
| 2,639,208 A | 5/1953 | Obenchain | |
| 2,903,150 A | 9/1959 | Rehrig | |
| 3,166,192 A | 1/1965 | Schultz et al. | |
| 3,266,765 A | 8/1966 | Campbell | |
| 3,392,869 A | 7/1968 | Needt | |
| 3,462,027 A * | 8/1969 | Puckhaber | 410/119 |
| 3,490,598 A | 1/1970 | Federman | |
| 3,517,849 A * | 6/1970 | Presnick | 220/4.28 |
| 3,802,595 A | 4/1974 | Frahm et al. | |
| 3,809,834 A | 5/1974 | Hipple | |
| D233,817 S | 12/1974 | Mathews et al. | |
| 3,889,834 A | 6/1975 | Harris, Jr. | |
| 3,907,117 A | 9/1975 | Williams | |
| 4,099,626 A | 7/1978 | Magnussen, Jr. | |
| 4,143,784 A | 3/1979 | Frahm et al. | |
| 4,426,794 A * | 1/1984 | Vanderheijden | 34/109 |
| 4,506,796 A | 3/1985 | Thompson | |
| 4,520,941 A * | 6/1985 | Hagan et al. | 220/675 |

(Continued)

FOREIGN PATENT DOCUMENTS

DE 22 53 304 5/1973

(Continued)

OTHER PUBLICATIONS

Partial International Search Report for PCT/US2007/064611, Sep. 7, 2007.

(Continued)

*Primary Examiner* — Sarah Purol
(74) *Attorney, Agent, or Firm* — Carlson, Gaskey & Olds

(57) ABSTRACT

A rack for securing containers includes a plurality of bays into which one or more containers are received. An expandable, inflatable chamber is disposed adjacent each bay and selectively expands into the chamber to secure the containers within the bay. When installed on a vehicle, a pump may be activated automatically based upon a vehicle operating state or whenever the door is closed. Activation of the pump inflates the expandable chambers, thereby locking containers in place in the bays. This prevents movement and vibration and reduces damage to the bottles during transportation.

28 Claims, 22 Drawing Sheets

U.S. PATENT DOCUMENTS

| | | | |
|---|---|---|---|
| 4,589,560 A | 5/1986 | Harris, Jr. | |
| 4,868,028 A | 9/1989 | de Rothschild | |
| 4,901,876 A | 2/1990 | Box | |
| 4,942,967 A | 7/1990 | Schneider | |
| 4,971,275 A | 11/1990 | Roberts | |
| 5,071,026 A | 12/1991 | Apps | |
| 5,097,980 A | 3/1992 | Warwick | |
| 5,135,702 A * | 8/1992 | Eales | 264/516 |
| 5,191,994 A * | 3/1993 | Stauble | 220/771 |
| 5,244,330 A * | 9/1993 | Tonjes | 414/331.01 |
| 5,261,208 A * | 11/1993 | Lockhart | 53/398 |
| 5,310,300 A * | 5/1994 | Crabb et al. | 414/280 |
| 5,339,979 A | 8/1994 | Box | |
| 5,370,245 A * | 12/1994 | Tersch et al. | 211/74 |
| 5,405,042 A * | 4/1995 | Apps et al. | 220/510 |
| 5,593,037 A | 1/1997 | Ohayon | |
| 5,891,000 A * | 4/1999 | Phillips | 482/49 |
| 5,947,305 A * | 9/1999 | Lin | 211/74 |
| 6,003,654 A * | 12/1999 | Webber et al. | 198/408 |
| 6,026,958 A * | 2/2000 | Kelly et al. | 206/503 |
| 6,135,297 A * | 10/2000 | DeShazo et al. | 211/74 |
| 6,142,300 A * | 11/2000 | Kelly et al. | 206/503 |
| 6,230,905 B1 | 5/2001 | Camblor | |
| 6,290,074 B1 * | 9/2001 | Syvuk et al. | 211/74 |
| 6,530,574 B1 * | 3/2003 | Bailey et al. | 277/314 |
| 6,811,042 B2 * | 11/2004 | Kelly et al. | 211/74 |
| 7,048,130 B2 | 5/2006 | Hurst | |
| 7,132,082 B2 | 11/2006 | Aviles et al. | |
| 7,237,675 B2 * | 7/2007 | O'Malley | 206/433 |
| 2003/0150826 A1 * | 8/2003 | Sheckells | 211/85.18 |
| 2004/0026346 A1 | 2/2004 | Kelly et al. | |
| 2004/0031711 A1 * | 2/2004 | O'Malley | 206/427 |
| 2005/0184020 A1 | 8/2005 | Thibodeau | |
| 2007/0206324 A1 * | 9/2007 | Donnell et al. | 360/133 |
| 2007/0221593 A1 * | 9/2007 | Apps | 211/74 |
| 2008/0083683 A1 * | 4/2008 | Apps et al. | 211/74 |
| 2008/0142459 A1 * | 6/2008 | Donnell et al. | 211/74 |

FOREIGN PATENT DOCUMENTS

| | | |
|---|---|---|
| DE | 199 36 683 | 2/2001 |
| DE | 102 52 370 | 5/2004 |
| EP | 1 186 470 | 3/2002 |
| GB | 1 390 518 | 4/1975 |
| WO | 02/42117 | 5/2002 |
| WO | WO 03/101259 A1 | 12/2003 |

OTHER PUBLICATIONS

"Prespray Pneuma-Seal" design guide, One Great Concept Three Great Applications, pp. 24.

* cited by examiner

RACK FOR CONTAINERS

BACKGROUND OF THE INVENTION

The present invention relates generally to a rack for holding objects and more particularly to a rack for holding water bottles.

A typical home delivery system for 3 and 5-gallon bottles of drinking water involves a delivery truck, racks, bottles and a driver. The delivery truck is usually configured with several bays on each side with each bay having a rollup door to enclose the product. Inside each bay one or more racks are stored filled with bottles. The racks are typically loaded and unloaded with bottles outside the bays. Fork trucks are used to move the racks in and out of the bays.

The racks have traditionally been made from metal and more recently from plastic. The plastic racks tend to be modular in design with each component making up a layer of the rack. The layer can hold four bottles in a two by two arrangement or eight bottles in a four wide by two deep arrangement. A two deep arrangement is for 5-gallon bottles whereas 3-gallon bottles will be three deep in the same space. The plastic components can sit on top of an existing pallet for transport or can incorporate runners or blocks into the bottom layer to eliminate the need for a pallet. In either case pallet trucks and jacks are the means for moving the racks. The modular design allows the distributor to stack them to any height but usually three to five layers high. At five layers the rack can hold up to forty 5-gallon bottles. Plastic racks have gained acceptance because they have proven to be more durable and the modular design allows for easy repair.

Leaking containers are a problem within the existing system. Testing has shown that the bouncing up and down of the bottles in the racks is a significant cause of leaking containers. Whenever the truck is moving the rack and bottles experience vibration and therefore relative movement. The movement at the contact points in combination with other environmental factors such as dirt and dust eventually weakens the bottle resulting in a hole or crack. Testing has shown that the softer plastic racks can reduce this, but a push toward lighter and thinner bottles to reduce costs has made the problem significantly worse in recent years.

One company has tested a metal (steel) rack that reduces the leaking container problems associated with the rack. This new rack incorporates a mechanical clamping device that locks each bottle in place during distribution. A steel tree within the rack links all the bottle pockets so that one large lever arm can lock and unlock all the bottles within the rack with one movement. A drawback to this rack is the force required to effectively clamp all the bottles in a rack. Testing has shown that the locking force from the tree on each bottle can average 100 lbs. For a 40-bottle rack this results in a total locking force of 4000 lbs. Cams and the length of the lever arm greatly reduce the input force needed from the driver but the force is still considerable. Obviously the driver will be resistant to using a system that increases his work load. Another problem with this design is that the locking force on individual bottles can vary by a large amount. This is due to a fixed travel height for the tree that cannot adjust to the varying bottle sizes and shapes as well as pocket to pocket variances within the rack.

In the current design the lever arm sticks out of the bay door when in the unlocked position. This prevents the bay door from being closed when in the unlocked position. This feature would guarantee that the locking device is used at every stop.

A second advantage of locking down the bottles is that it prevents the bottles from "walking" out of the racks during transport. In the worst case of walking, the bottle cap will rest against the inside of the bay door. When the driver tries to lift the door the cap can jam against the raised corrugations on the inside of the door. Much time and effort is required to solve this problem each time it occurs.

However, even with the existing clamping system, there is still the possibility that the driver will deliver bottles to the customer, then return to the truck and drive away while forgetting to clamp the bottles and close the door at all. When this occurs, the bottles can fall out of the vehicle, littering the roadway and possibly causing damage to other vehicles.

SUMMARY OF THE INVENTION

The present invention provides a rack for securing objects, such as containers, and more particularly water bottles. The rack defines a plurality of bays into which one or more containers are received. An expandable clamp including an inflatable chamber is disposed adjacent each bay and expands into the chamber to secure the containers within the bay.

When installed on a vehicle, a pump (or other air source) may be activated automatically whenever the door is closed and/or whenever the vehicle is shifted into gear (or when the engine is started). Activation of the pump inflates the expandable chambers, thereby locking containers in place in the bays. This prevents movement and vibration and reduces damage to the bottles during transportation

BRIEF DESCRIPTION OF THE DRAWINGS

Other advantages of the present invention will be readily appreciated as the same becomes better understood by reference to the following detailed description when considered in connection with the accompanying drawings wherein:

FIG. 6 is a side view of the rack of FIG. 1.

DETAILED DESCRIPTION OF THE PREFERRED EMBODIMENT

Figure 1:
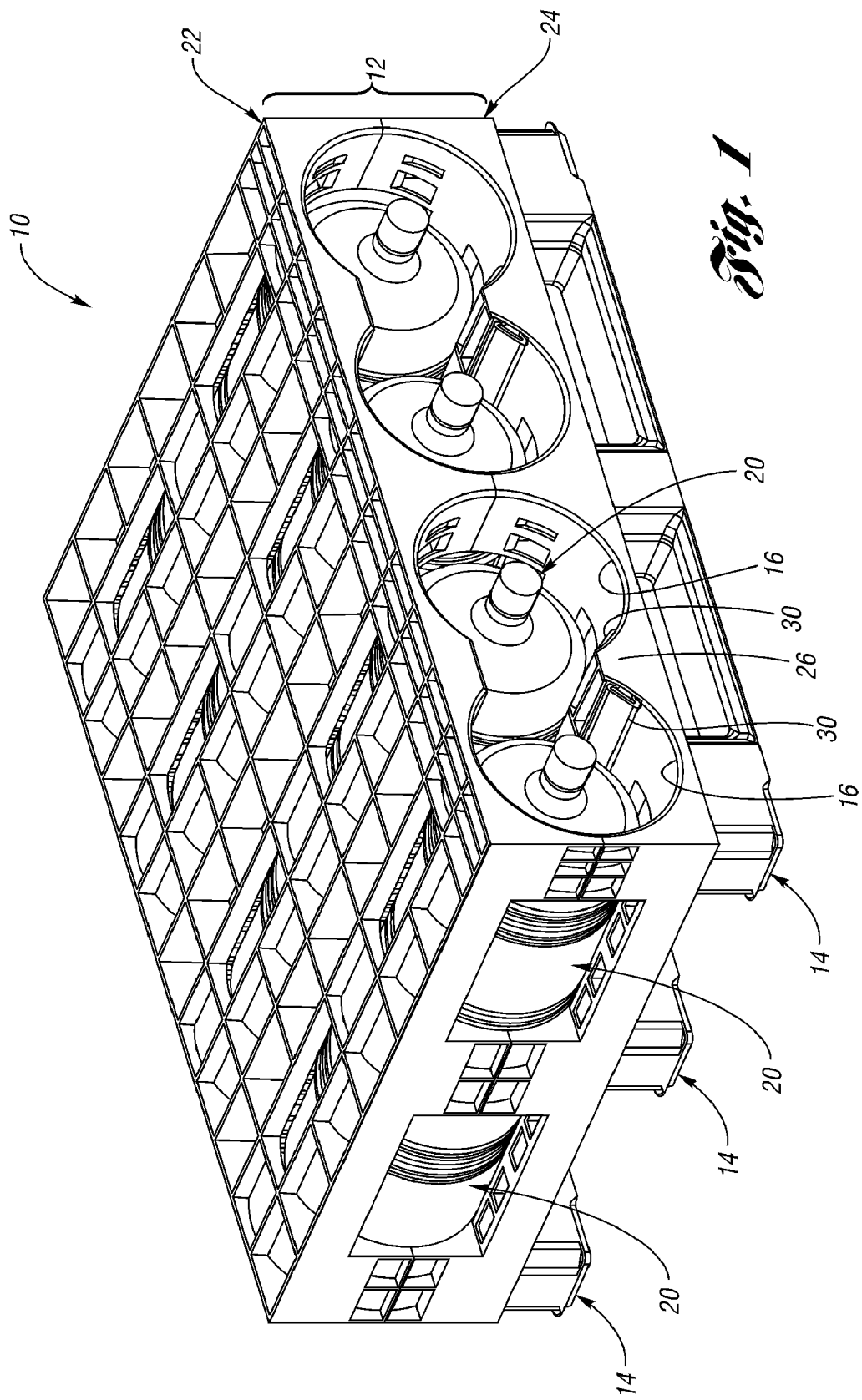
FIG. 1 is a perspective view of a rack according to a first embodiment of the present invention holding a plurality of containers.

A rack 10 according to a first embodiment of the present invention is shown in FIG. 1. The rack 10 includes a first layer 12 (or first "shelf") supported on a plurality of supports 14. The first layer 12 defines a plurality of generally cylindrical bays 16. A pair of containers 20, in this case a pair of five gallon water bottles 20, can be received within each bay 16. The first layer 12 includes an upper section 22 and a lower section 24. The lower section 24 includes a partial divider 26 between each adjacent pair of bays 16. An expandable, inflatable clamping chamber 30 is mounted on each side of the divider 26 adjacent the bottles 20. The expandable chambers 30 are elongated, flexible pneumatic bladders or seals that extend from the front of the rack 10 to the rear of the rack 10.

Figure 2:
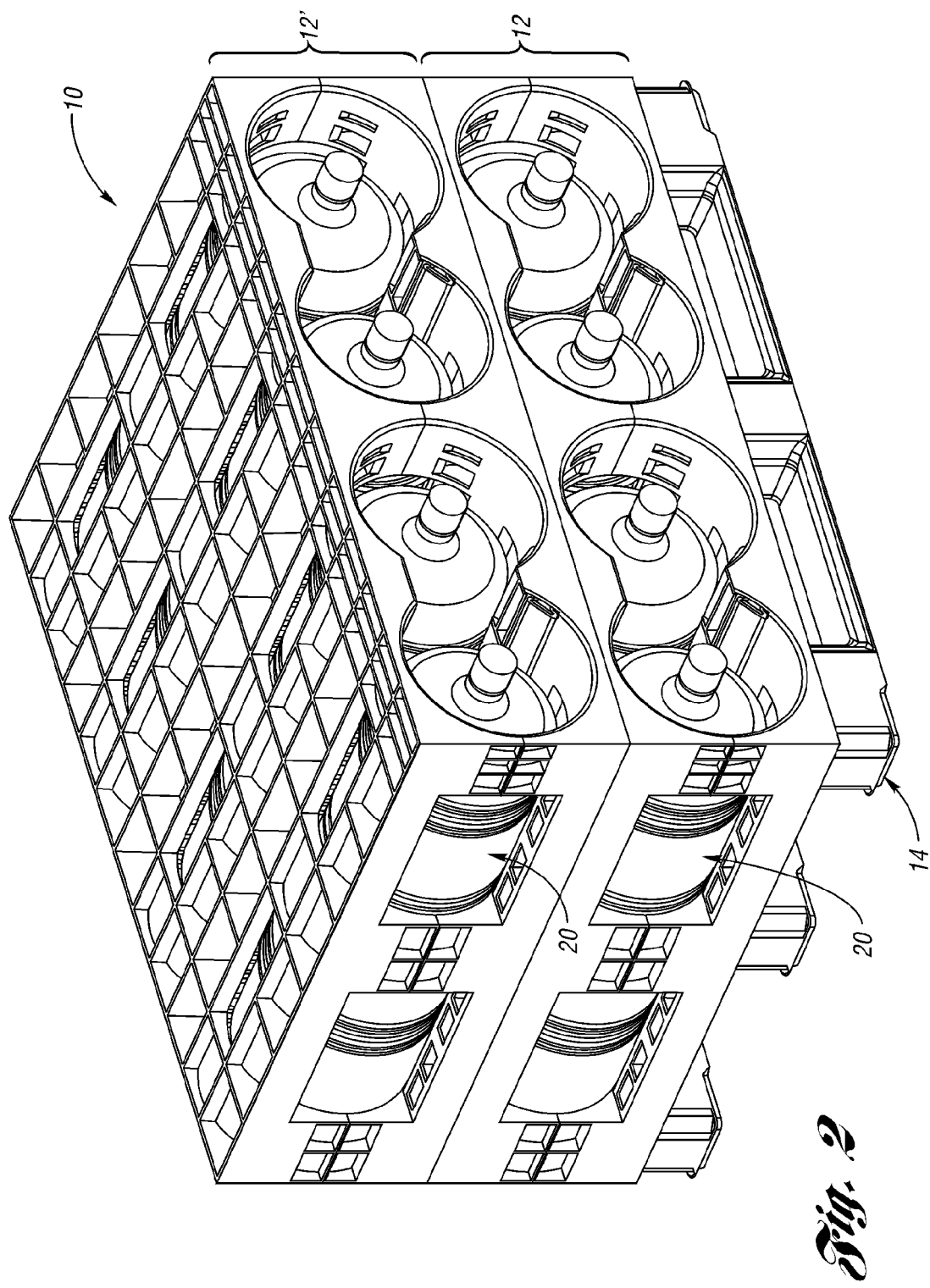
FIG. 2 is a perspective view of the rack of FIG. 1 with an additional layer.

As shown in FIG. 2, the rack 10 can be expanded by adding additional shelves, such as a second layer 12', stacked on top of the first layer 12. Both layers 12, 12' are supported on the supports 14 above the floor, such that the rack 10 can be lifted and moved with a forklift. As explained above, it is anticipated that three to five layers 12 would be installed in each bay of a delivery truck.

Figure 3:
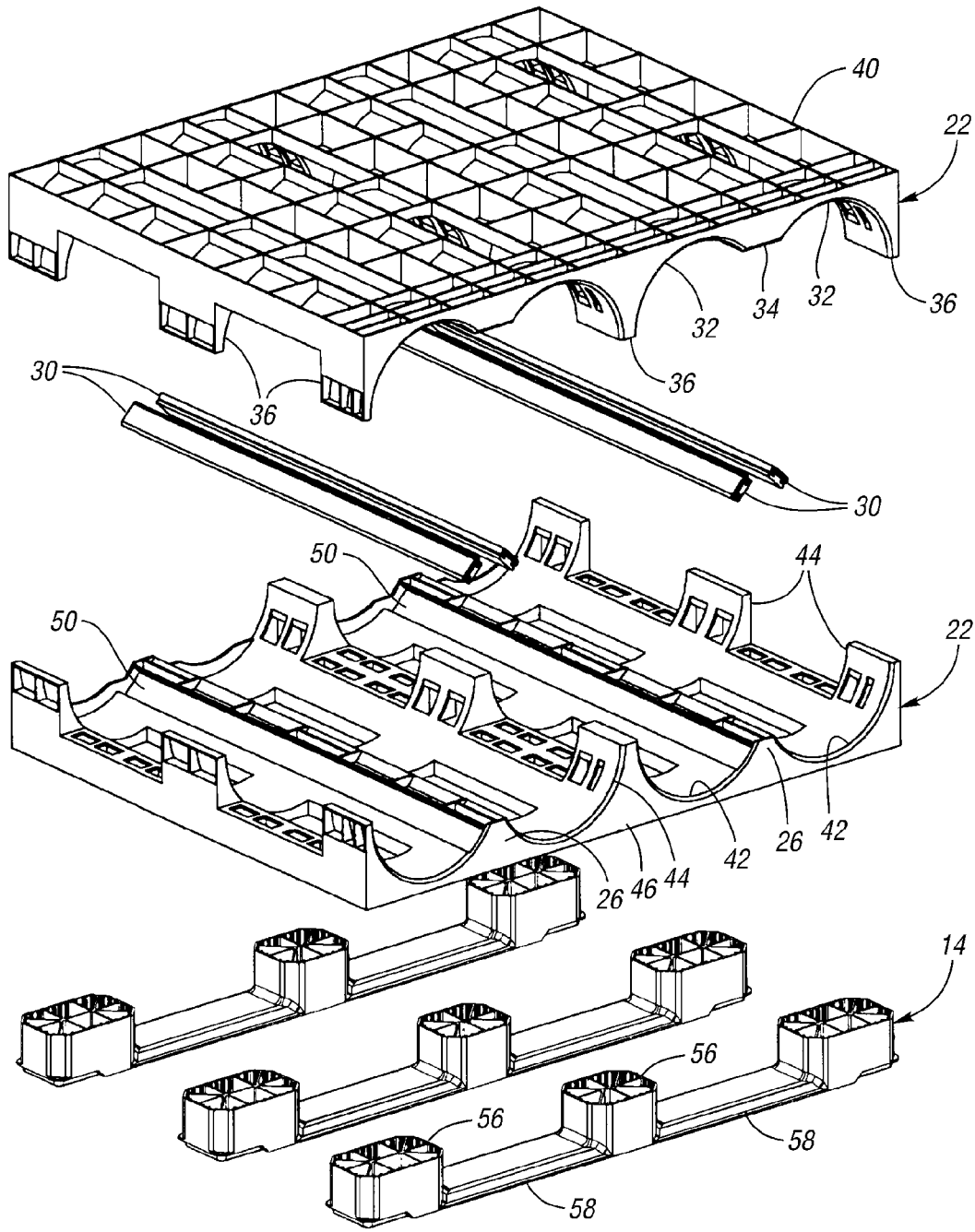
FIG. 3 is an exploded view of the rack of FIG. 1.

FIG. 3 is an exploded of the rack 10 in FIG. 1. The upper section 22 includes semi-cylindrical recesses 32 defined between column portions 36 and partial divider 34. The partial 34 divider and column portions 36 extend downwardly from a deck 40. The upper section 22 and lower section 24 are each integrally molded as a single piece of plastic, such as polypropylene, or another suitable material.

The lower section 24 similarly includes adjacent pairs of semi-cylindrical recesses 42 defined between column portions 44 and the partial divider 26. The partial divider 26 and column portions 44 extend upwardly from a deck 46. The partial divider 26 includes mounting areas 50 to which the expandable chambers 30 are mounted. Each of the supports includes a plurality of columns 56 connected by struts 58. The columns 56 mount to the underside of the deck 46 of the lower section 24. The bays 16 (FIG. 1) are defined by the semi-cylindrical recess 42 on the lower section 24 and the semi-cylindrical recesses 32 on the upper section 22.

Figure 4:
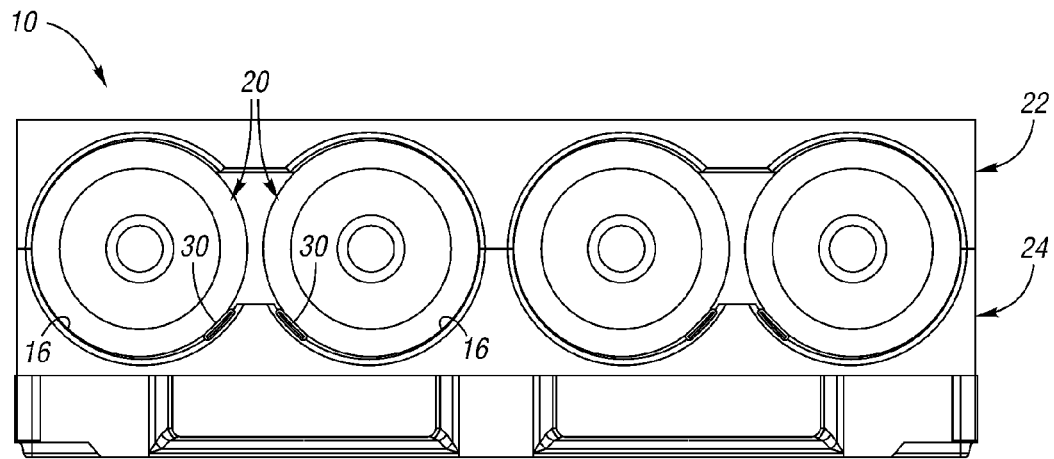
FIG. 4 is a front view of the rack of FIG. 1.

FIG. 4 is a front view of the rack 10 of FIG. 1 when the expandable chambers 30 are deflated. With the expandable chambers 30 in the deflated condition, the bottles 20 can be inserted into and removed from the bays 16.

Figure 5:
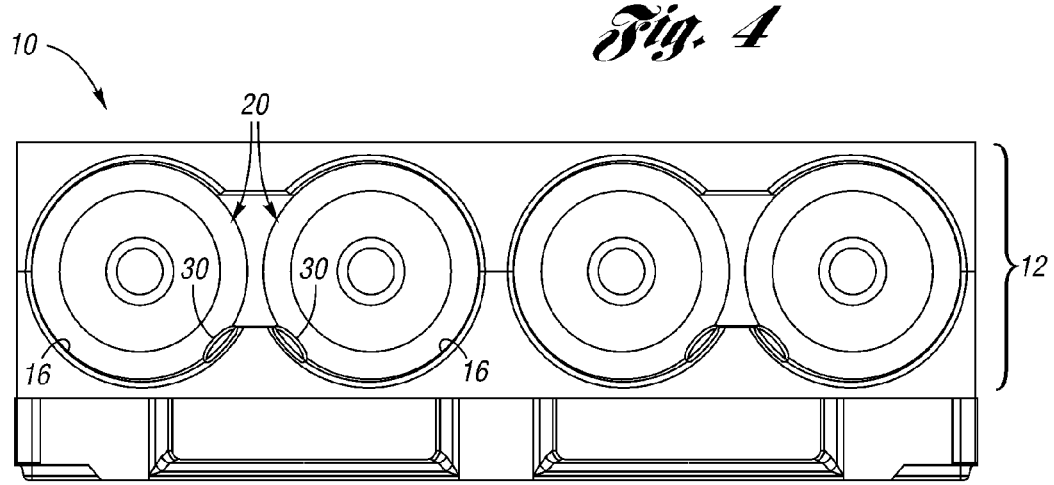
FIG. 5 shows the rack of FIG. 4 with the chambers expanded.

FIG. 5 illustrates the rack 10 with the expandable chambers 30 expanded. The expandable chambers 30 are expanded and inflated by air pressure inside the expandable chambers 30. For example, the expandable chambers 30 are inflated to a pressure that will result in a force of about one-hundred pounds locking each of the bottles 20 inside the bays 16. This effectively clamps the bottles 20 in the rack 10, preventing damage to the bottles 20 from the vibration during transport. Before moving the bottles 20 from the rack 10, expandable chambers 30 must be deflated. The bottles 20 can then be slid out of the bays 16. Because the expandable chambers 30 are flexible, they conform to the shape of the bottles 20 and will not damage the bottles 20. The expandable chambers 30 also prevent the bottles from sliding out of the bays 16 during transport.

Figure 5A:
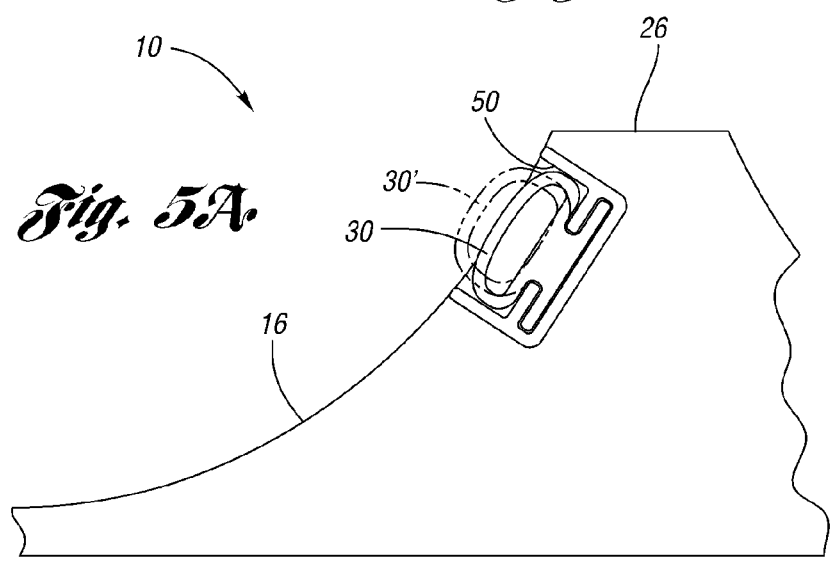
FIG. 5A is an enlarged view of one of the chambers expanded and contracted adjacent an empty bay.

FIG. 5A is an enlarged view of one of the chambers 30 in the mounting area 50 adjacent an empty bay 16. The chamber 30 is shown in both the uninflated condition, where it does not protrude into the bay, and the chamber 30' is shown in phantom in its inflated condition. Note that the expanded chamber 30' protrudes into the bay 16 because there is no bottle 20 in FIG. 5A to prevent it from doing so. FIG. 6 is a side view of the rack 10 with the bottles 20.

Figure 7:
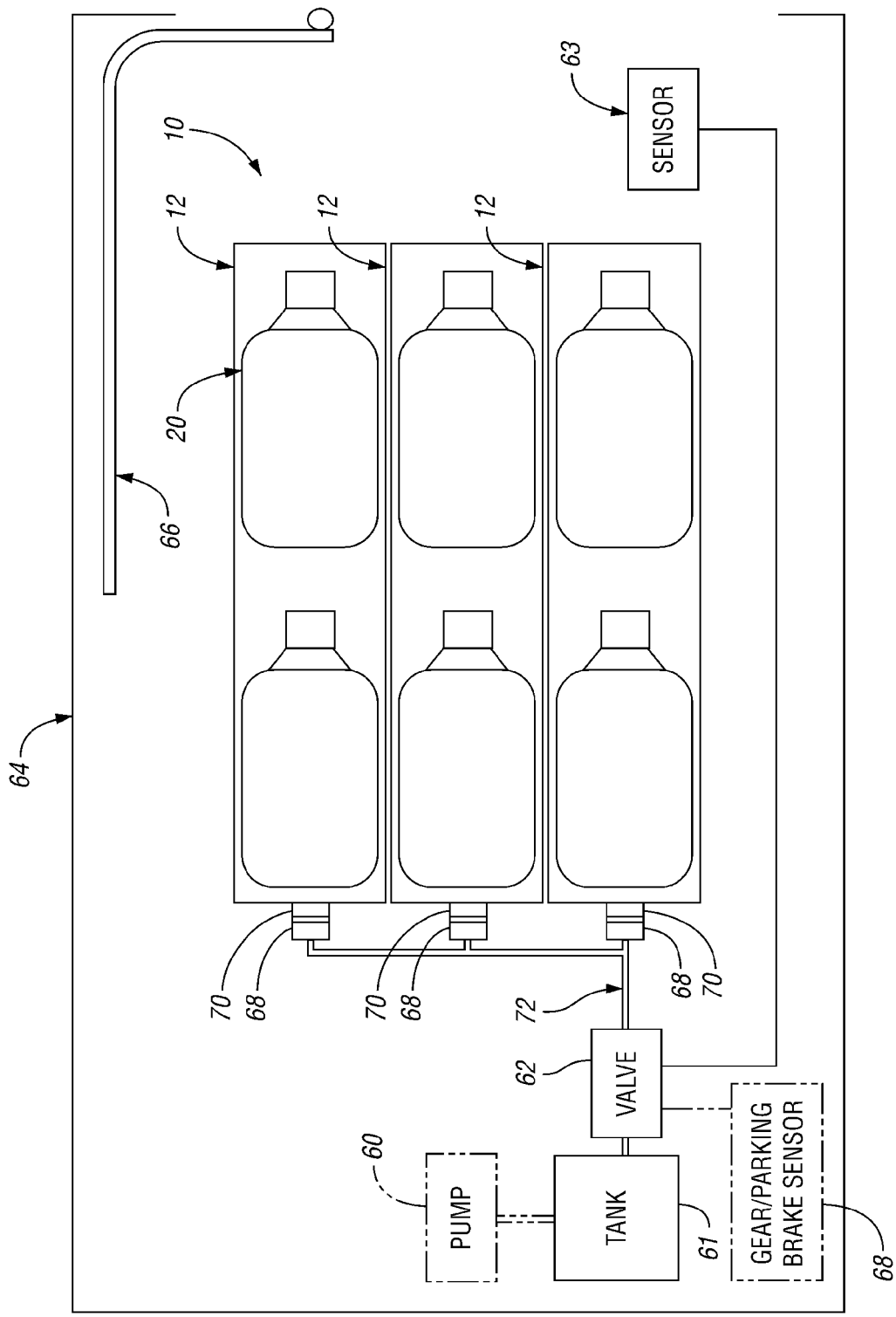
FIG. 7 is a side view of a rack of several of the layers of FIG. 1 and a schematic of the system for operating the rack in a vehicle.

FIG. 7 is a schematic side view of a rack 10 of several layers 12 containing bottles 20 installed in a truck 64. FIG. 7 also schematically shows a pump 60 (or compressor), a pressurized tank 61, a valve 62 and a sensor 63 for actuating the rack 10. The sensor 63 is installed adjacent the door 66 of the truck 64. The pump 60 maintains pressure in the tank 61 within a set range in a known manner. The sensor 63 controls the valve 62 (such as a three-way valve) based upon whether the door 66 is opened or closed. The valve 62 vents pressure from the rack 10 when the door 66 is opened and then pressurizes the rack 10 with pressure from the tank 61 when the door 66 is closed. The tank 61 is connected to the rack 10 via conduits 72 each having a quick disconnect 68 formed thereon for connection to a complementary coupling 70 on the rack 10. Note that a single roll-up door 66 is shown, but one or more swinging doors 66 could also be used.

In operation, the user loads the bottles 20 into the rack 10 on the truck 64 and then closes the door 66. Upon detecting that the door 66 is closed, the sensor 63 activates the pump 60 which supplies pressure to the expandable chambers 30 as shown in FIG. 5. This locks the bottles 20 in place in the bays 16 in the rack 10, preventing vibration, damage and movement of the bottles 20 during shipment. When the door 66 is open, the sensor 63 detects the opening of the door 66 and causes the pump 60 to release the air pressure in the expandable chambers 30 which return to the position shown in FIG. 4. The bottles 20 can then be removed from the bays 16 for delivery. Empty bottles 20 can also be loaded on the rack 10. When the door 66 is closed again, the expandable chambers 30 are again inflated. Thus, the system is automated and requires no user interaction.

As a first alternative, the pump 60 could be eliminated. For local delivery trucks, it is possible to store sufficient pressure in the tank 61 for at least one delivery route. The tank 61 would be repressurized when the truck 64 returns to the distribution center to return the empty bottles 20 and pick up more full bottles 20.

As a second alternative, the pump 60, tank 61 and valve 62 could all be eliminated from the truck 64, if the truck 64 is transporting the bottles 20 from a warehouse to a distribution center, or for some other reason, no bottles 20 will be removed from the racks 10 during transportation. In this situation, the racks 10 can be pressurized at the warehouse before being loaded on the truck 64. The pressurized racks 10 remain pressurized without any additional outside source of pressure to protect the bottles 20 during shipment and during loading/unloading at the warehouse and distribution center.

The valve 62 could also be activated based upon a gear/parking brake sensor 65 (or other vehicle operating state) that activates the valve 62 based upon the truck 64 being shifted into and out of a parking gear or based upon the application/release of a parking brake. Therefore, even if the driver forgets to close the door 66, the racks 10 will be pressurized and the bottles 20 will be locked in place when the parking brake is released and/or when the truck 64 is shifted into gear. Alternatively, a motion or speed sensor could pressurize the racks 10 whenever motion of the vehicle 64 is sensed.

Figure 9:
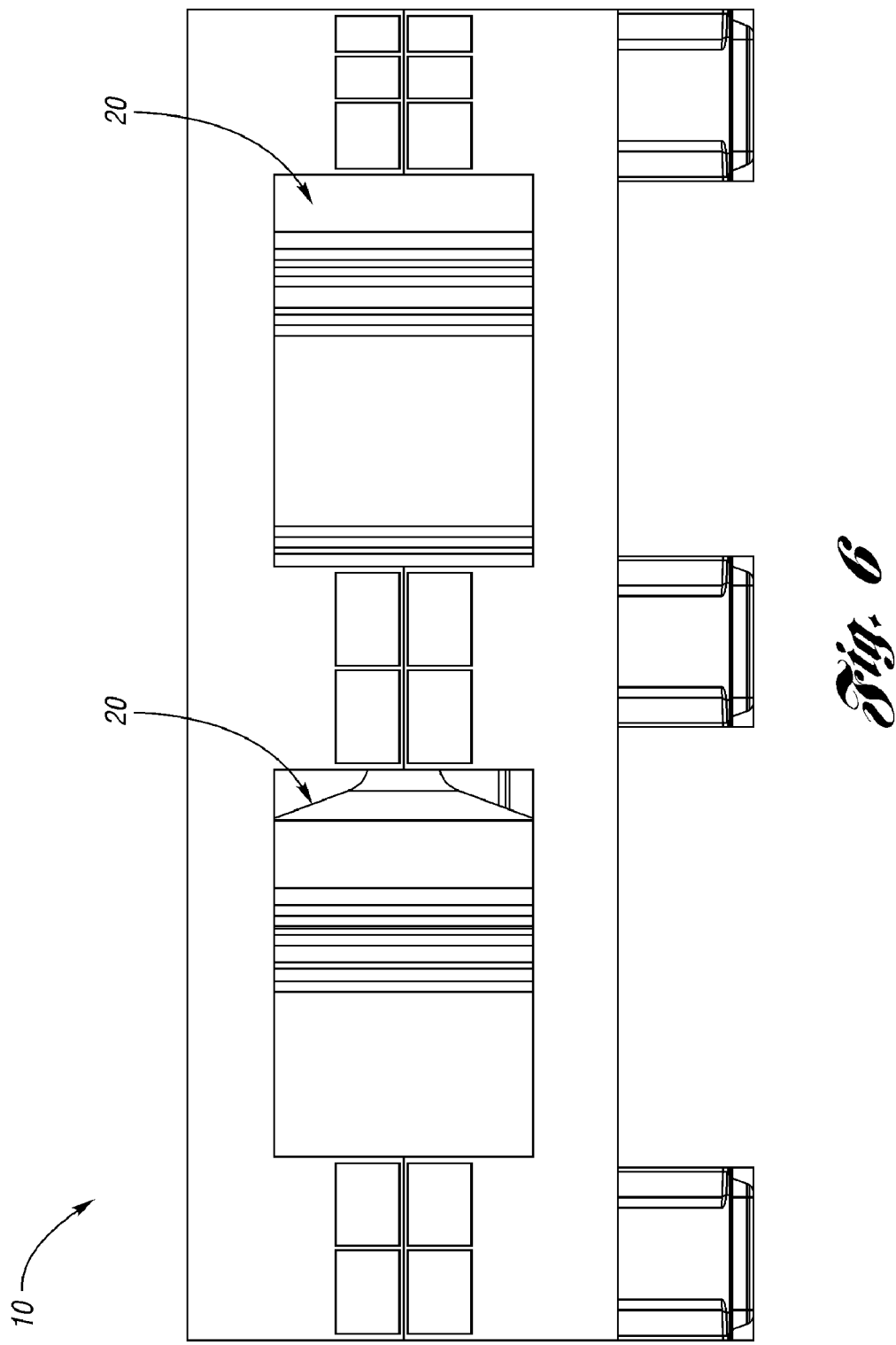
FIG. 9 is an exploded view of the rack of FIG. 8.
Figure 8:
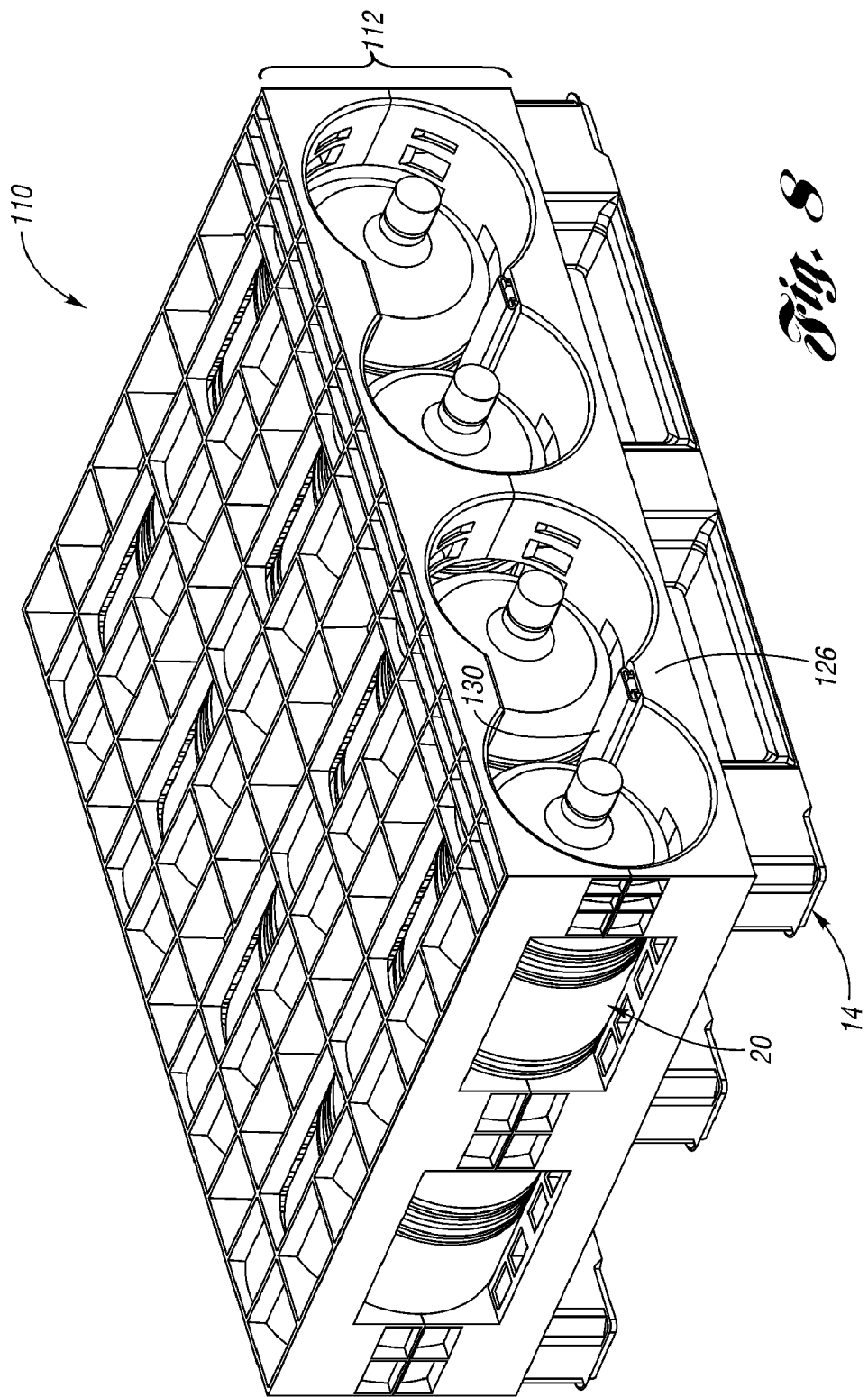
FIG. 8 is a perspective view of a rack according to a second embodiment.
Figure 9:
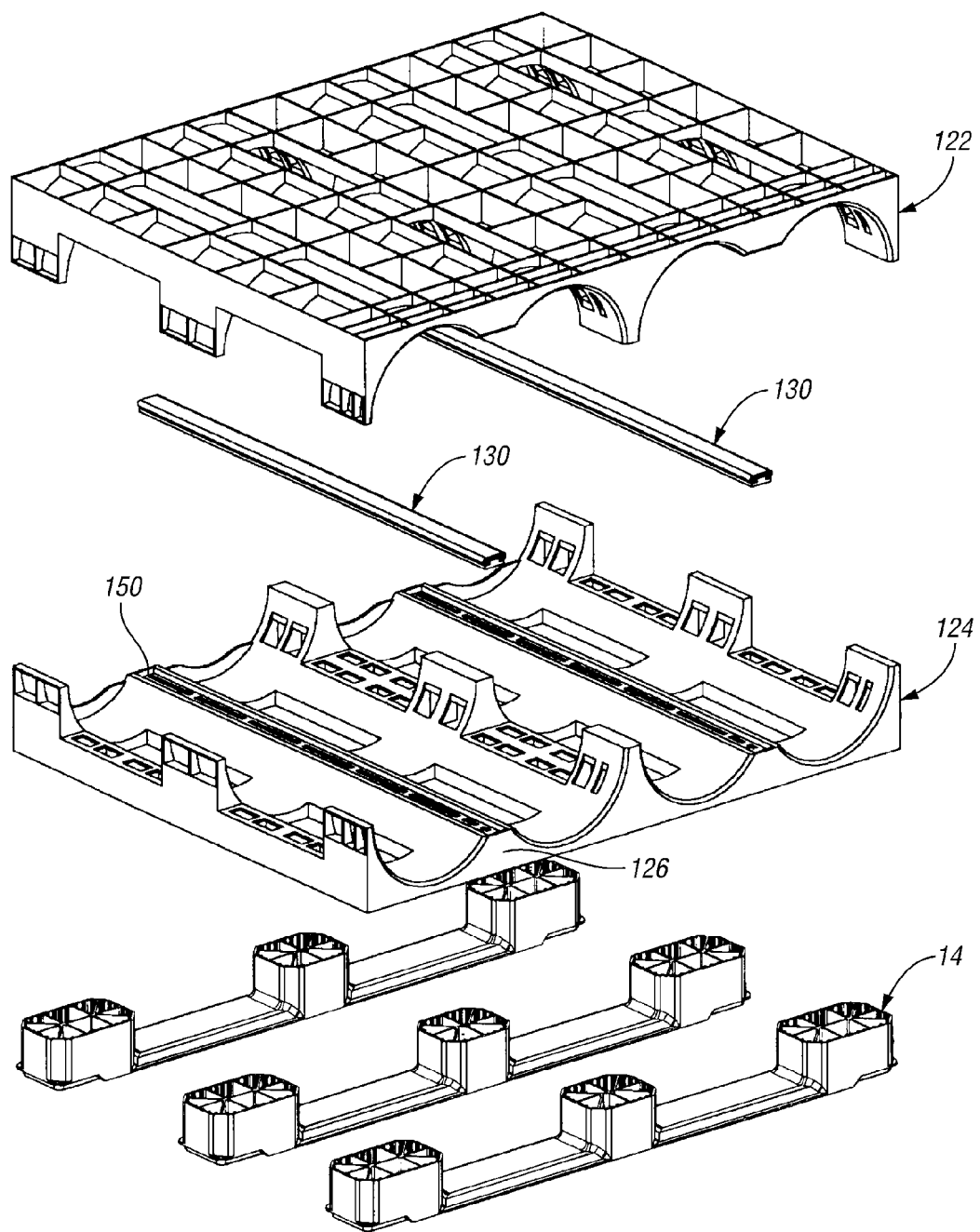
Figure 10:
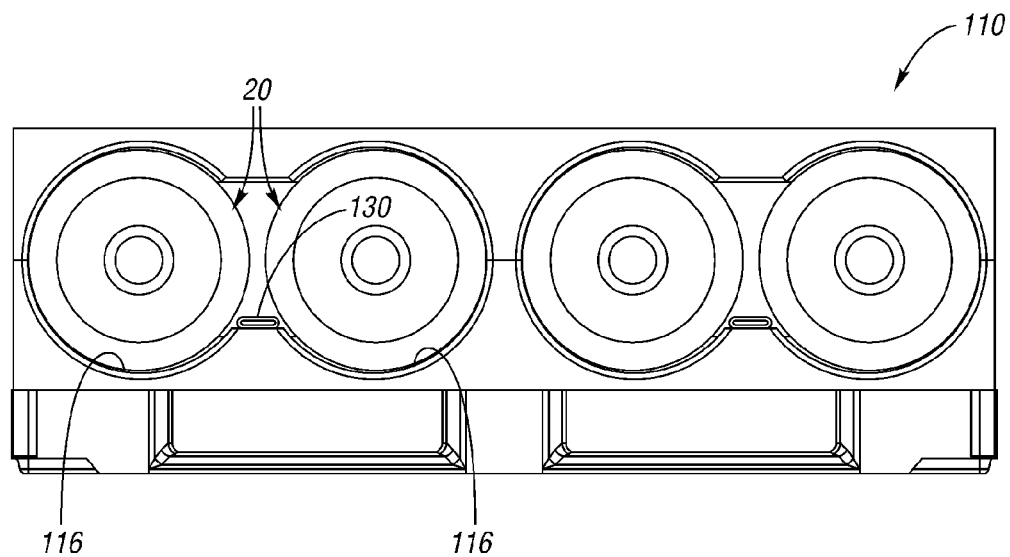
FIG. 10 is a front view of the rack of FIG. 8.
Figure 11:
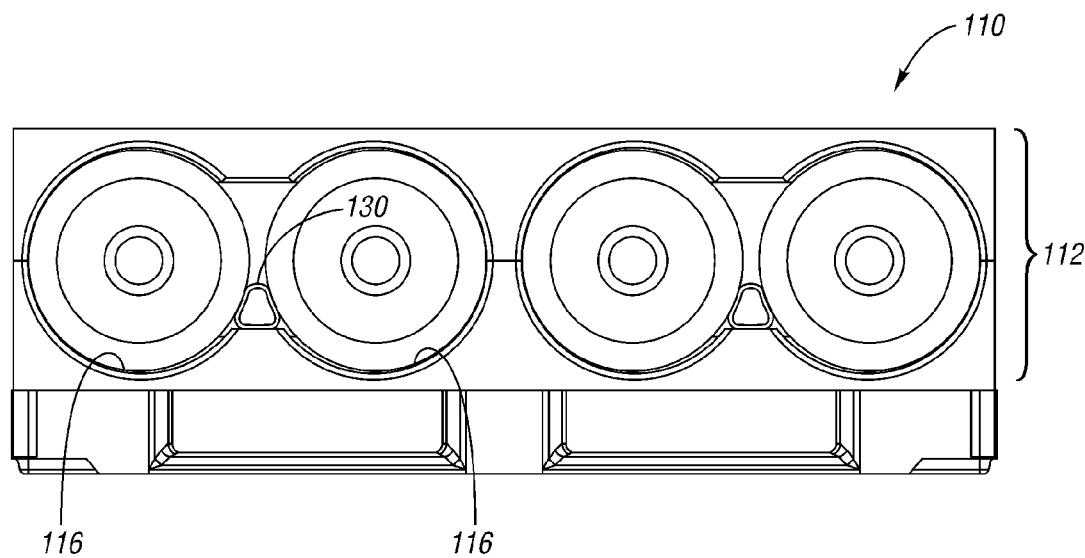
FIG. 11 illustrates the rack of FIG. 10 with the chamber expanded.

A rack 110 according to a second embodiment is shown in FIG. 8. The rack 110 is similar to the rack 10 in structure and operation except as otherwise described below or shown in the drawings. Corresponding components will be designated with reference numerals prefixed with a "1." In this rack 110, the expandable chamber 130 is positioned on top of the partial divider 126. As shown in FIG. 9, the mounting area 150 is formed on the top of the partial divider 126. FIG. 10 is a front view of the rack 110 with the expandable chambers 130 deflated. In this position the bottles 120 are not in contact with the expandable chamber 130 and can be easily inserted into or removed from the bays 116. Upon inflation of the expandable chambers 130 in the manner described above, the expandable chambers 130 each contact the bottles 20 in two adjacent bays 116 as shown in FIG. 11. This arrangement in the rack 110 reduces the total number of expandable chambers 130 that are necessary.

Figure 12:
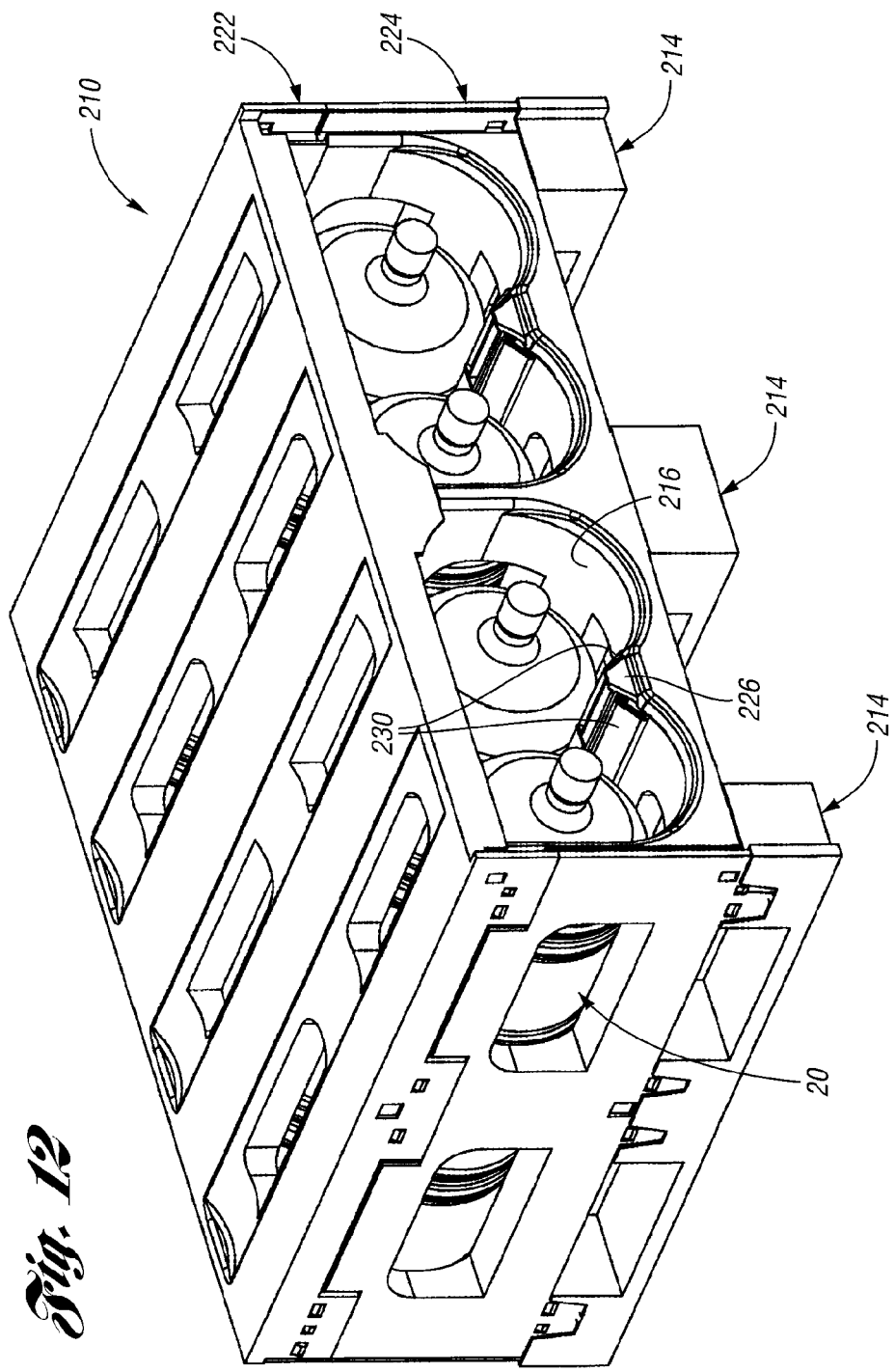
FIG. 12 is a perspective view of a rack according to a third embodiment.
Figure 13:
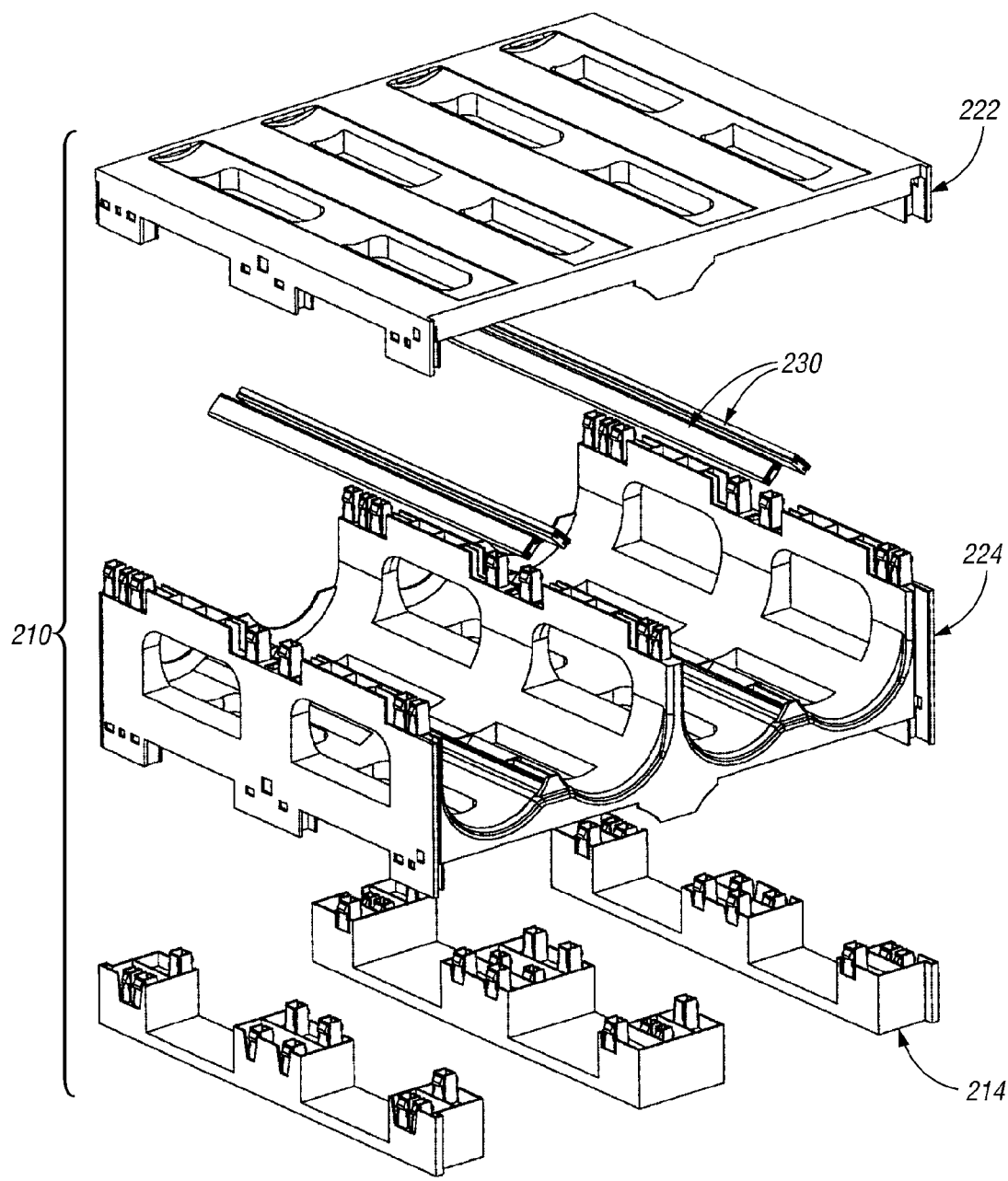
FIG. 13 is an exploded of the rack of FIG. 12.

FIG. 12 illustrates a rack 210 according to a third embodiment. Except as otherwise described below or shown in the drawings, the rack 210 is similar in structure and operation to racks 10, 110. In this rack 210, the cylindrical bays 216 are defined on either side of the partial divider 226 and an expandable chamber 230 is provided for each bay 216. As shown in FIG. 13, the supports 214 snap-fit into the lower section 224 which in turn snap-fits into the upper section 222 for easy assembly of the rack 210.

Alternate arrangements and locations of the expandable chambers 30, 130, 230 are also possible. For example, the expandable chambers 30, 130, 230 may be placed on the upper halves 22, 122, 222 of the racks 10, 110, 210 so that the pressure exerted by the expandable chambers 30, 130, 230 is in the same direction as the gravity acting on the bottles 20. Alternatively, the expandable chambers 30, 130, 230 could be positioned inside or behind a wall of a rack section, such that expansion of the chamber deforms the plastic wall, thereby clamping the bottle 20 inside the bay.

Figure 14:
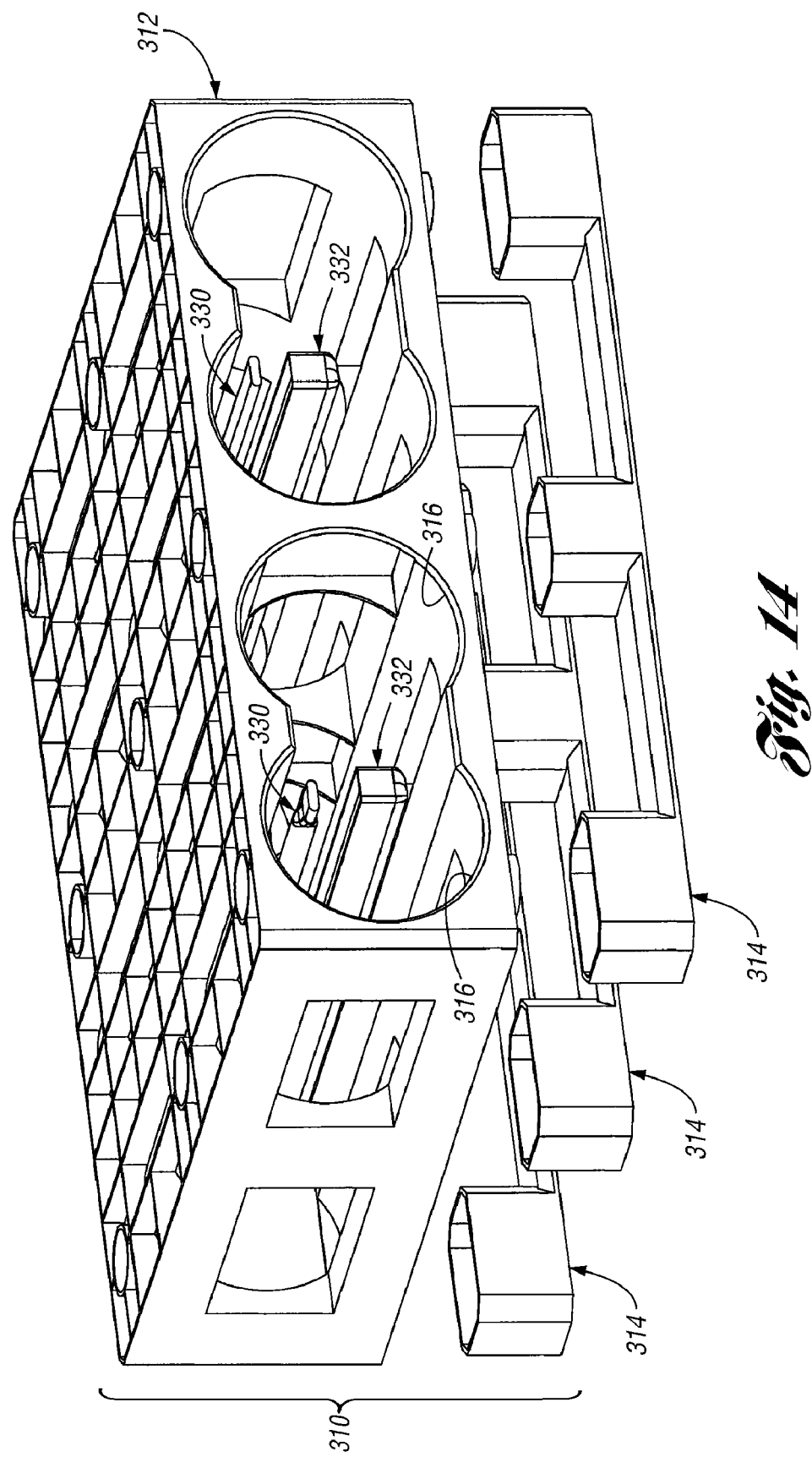
FIG. 14 is an exploded view of a rack according to a fourth embodiment.
Figure 15:
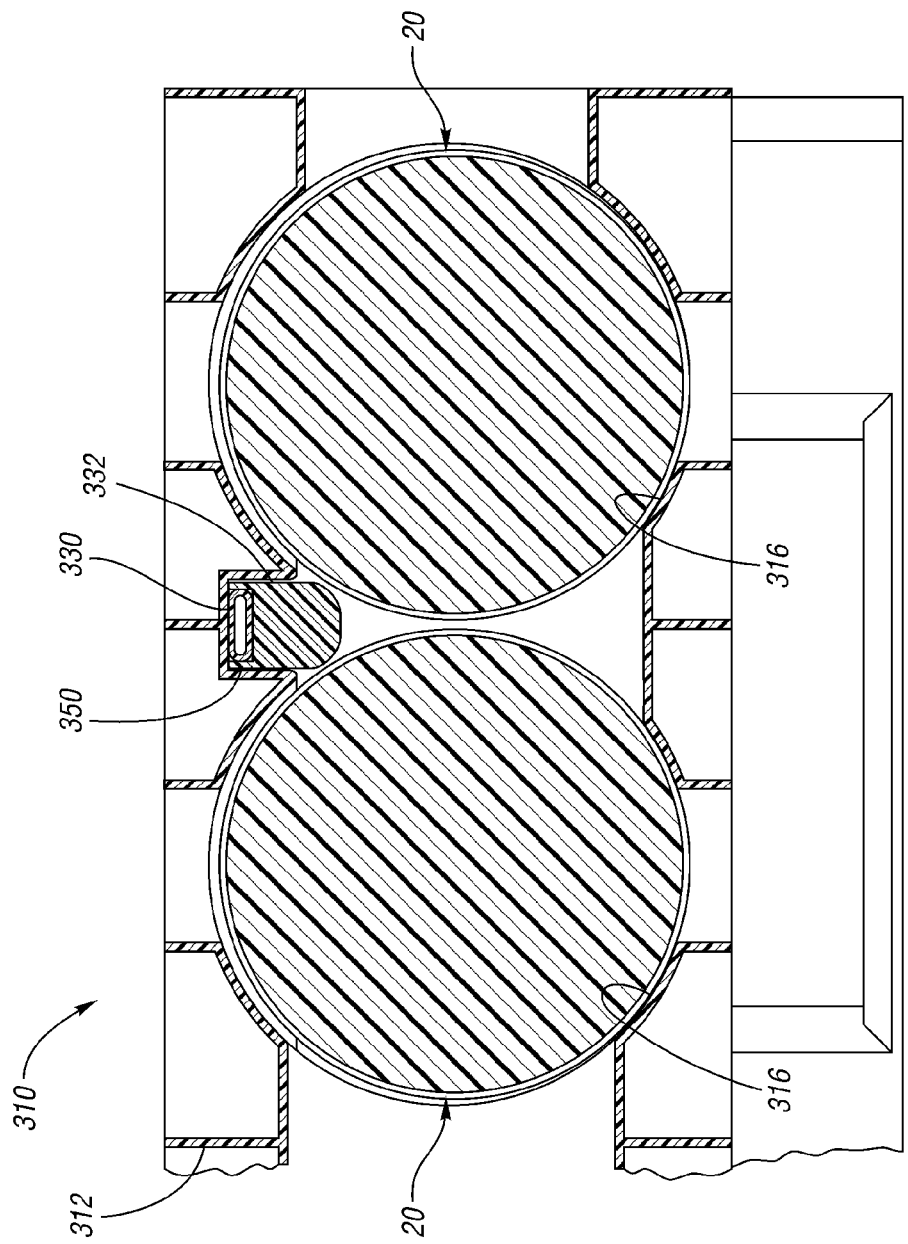
FIG. 15 is a section view through two of the bays of the rack of FIG. 15 containing bottles, with the clamp in the released position.

FIG. 14 is an exploded view of a rack 310 according to a fourth embodiment. Each shelf or layer 312 (one shown) is integrally molded as a single piece, not in halves, and supported on a plurality of supports 314. In this embodiment, the expandable chambers 330 are mounted inside and behind plastic clamps. Referring to FIG. 15, which is a section view through two of the bays 316 containing bottles 20, the expandable chamber 330 is positioned in a mounting recess 350 in an upper wall of the first layer 312 (it could alternatively be positioned in the lower wall directed upwardly). A clamp 332 is slidably mounted in the mounting recess 350 over the expandable member 330.

Figure 16:
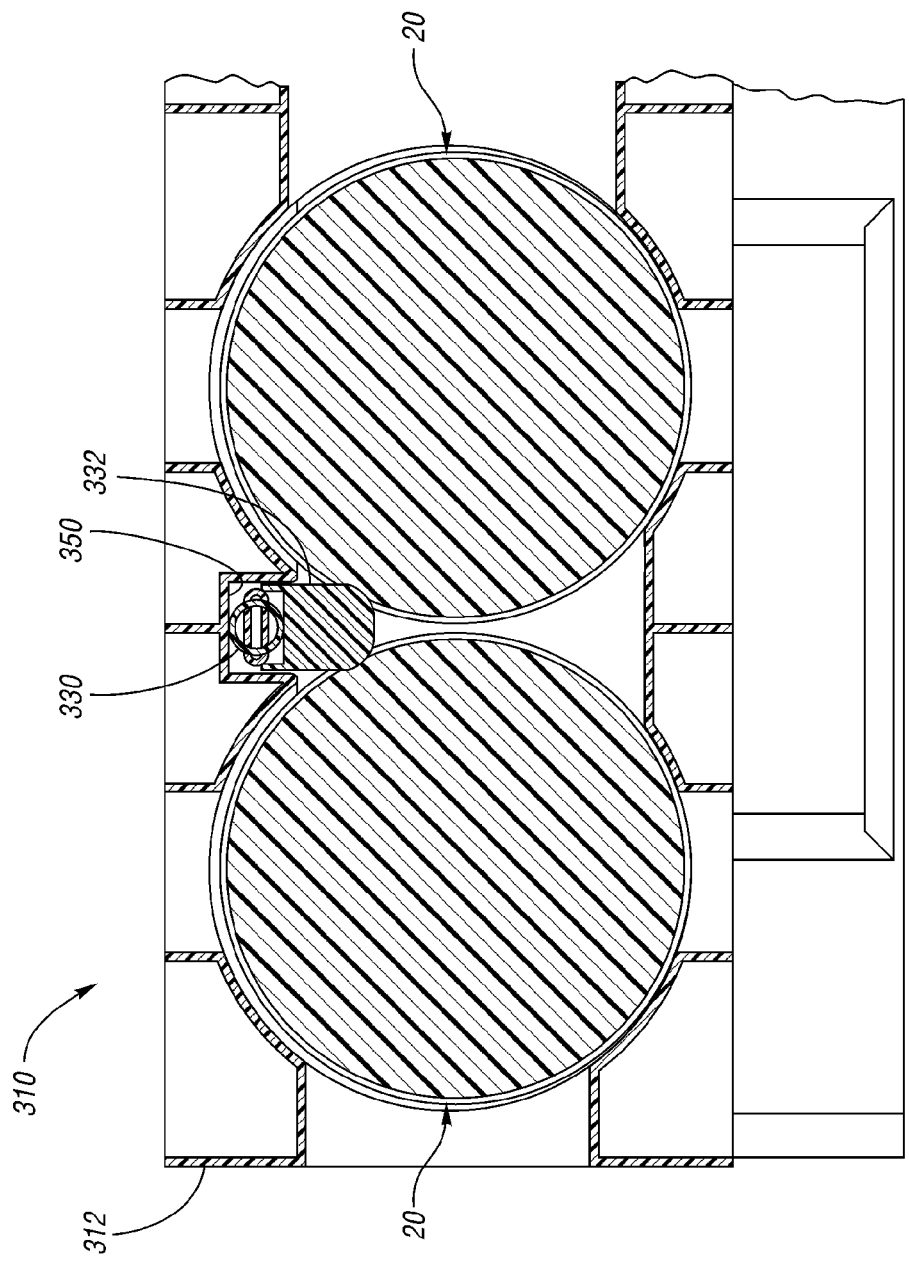
FIG. 16 is similar to FIG. 15, with the clamp in the engaged position.

When the expandable member 330 is expanded as shown in FIG. 16, the expandable member 330 urges the clamp 332 downwardly against both bottles 20 in both bays 316. Although the clamp 332 is relatively rigid, the flexible expandable member 330 behind it provides a resilient clamping force on the bottles 20, which prevents damage to the bottles 20.

Figure 17:
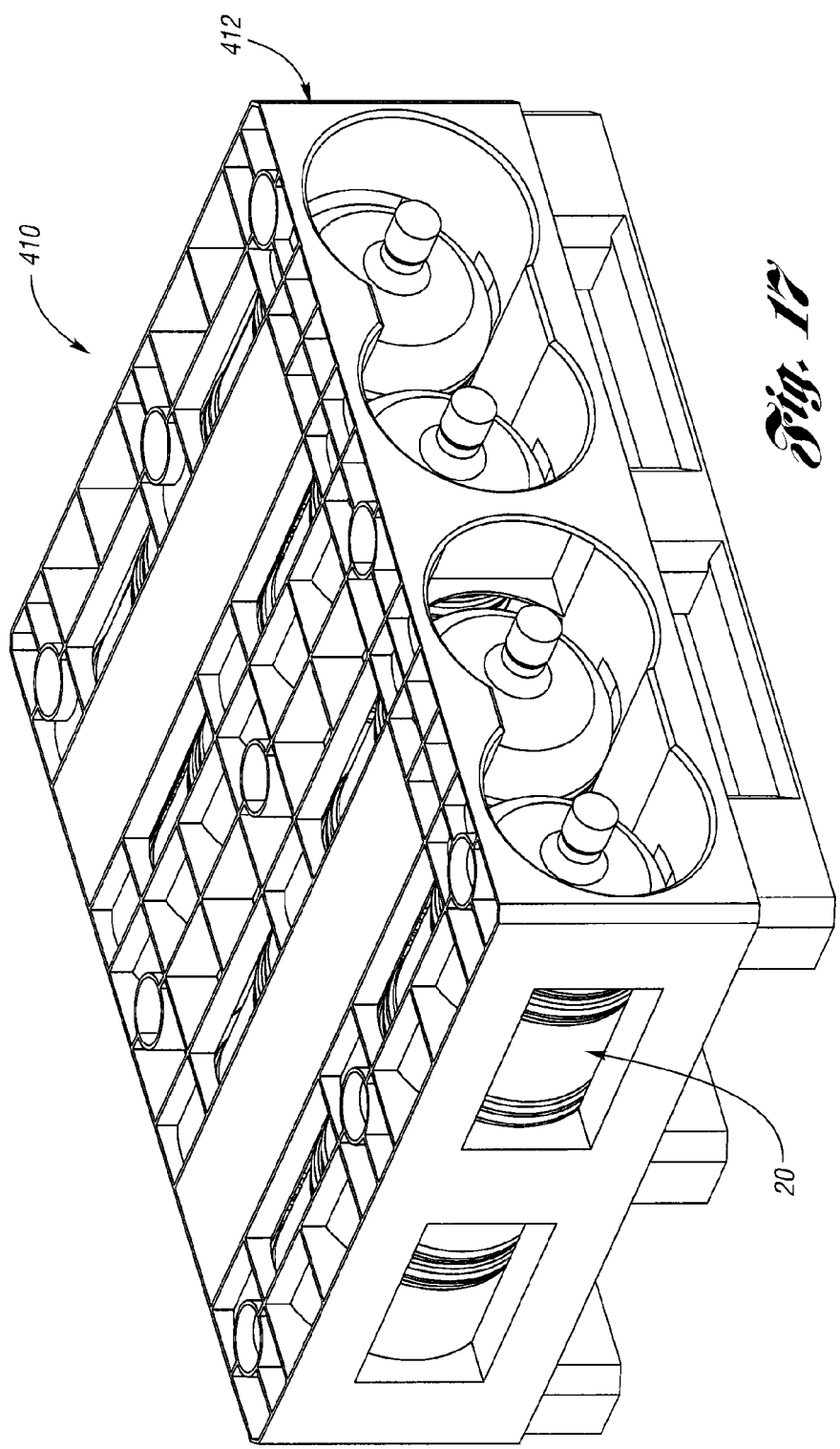
FIG. 17 is a perspective view of a rack according to a fifth embodiment.
Figure 18:
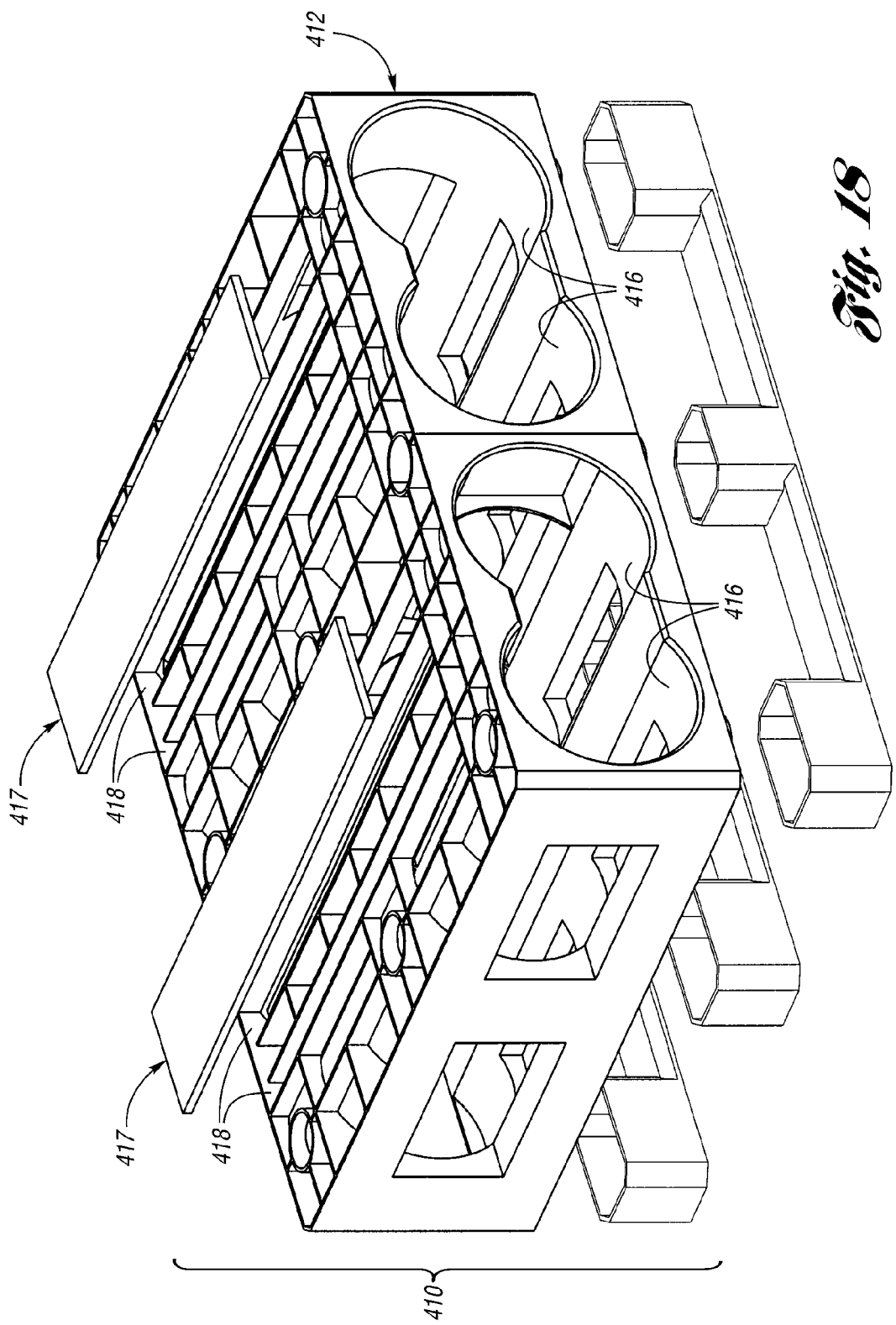
FIG. 18 is an exploded view of the rack of FIG. 17.
Figure 19:
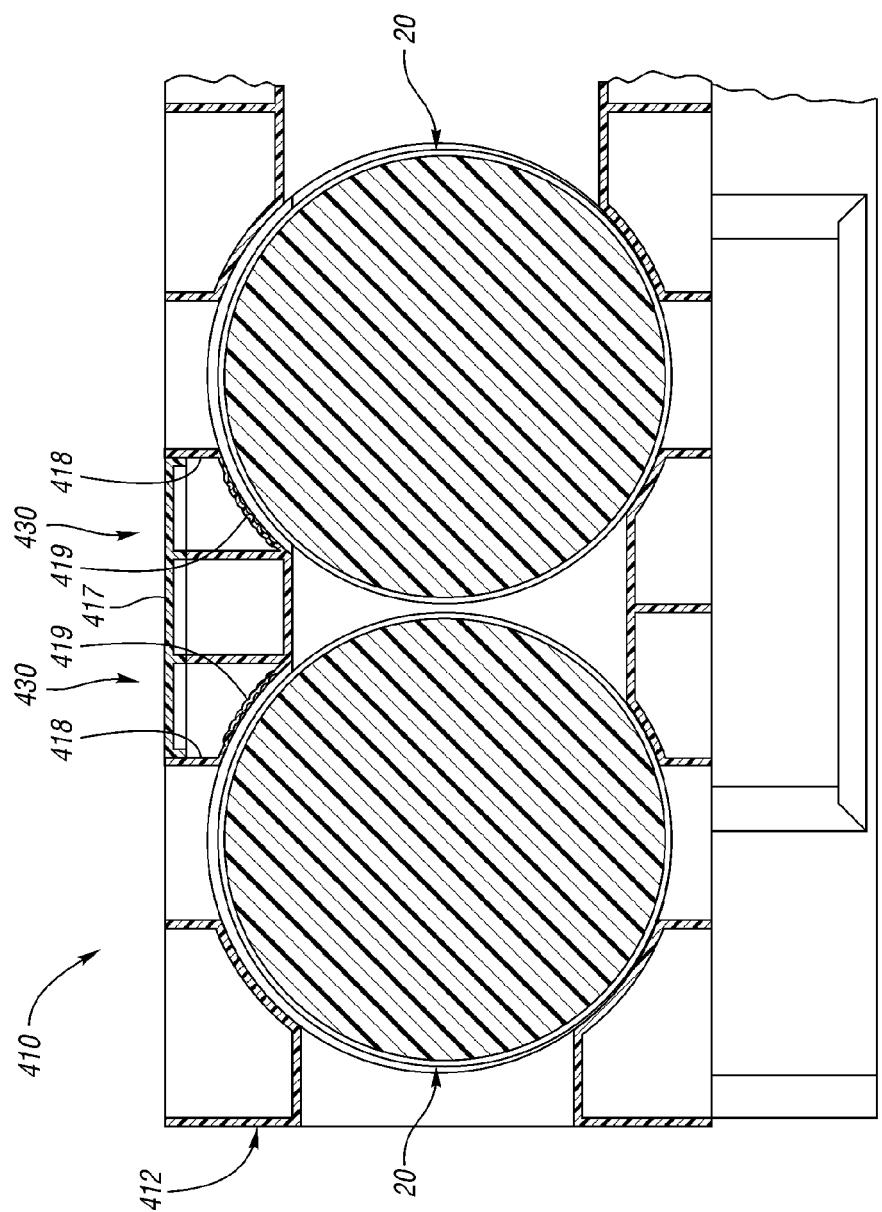
FIG. 19 is a section view through two of the bays of the rack of FIG. 17 containing bottles, with the clamps in the released position.
Figure 20:
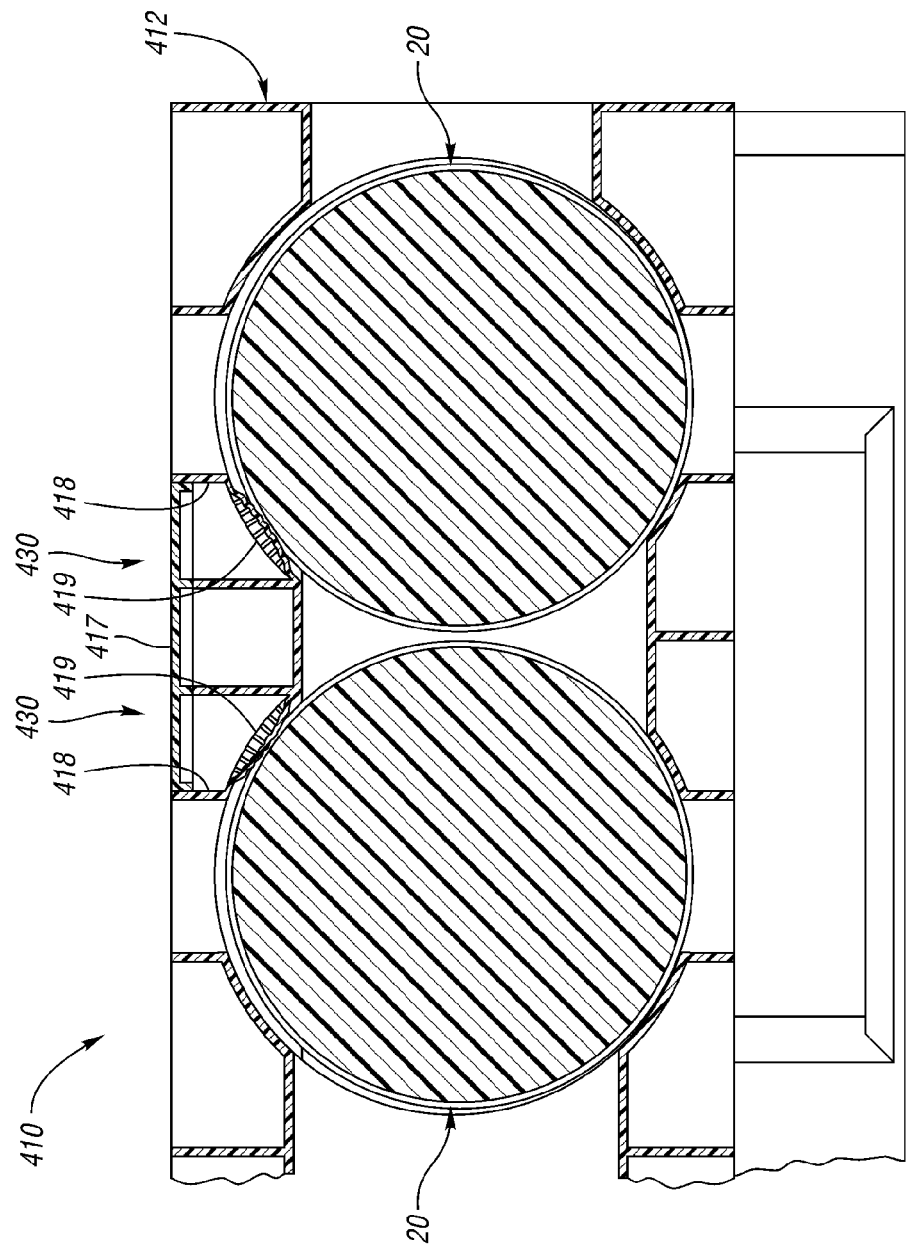
FIG. 20 is similar to FIG. 19, with the clamps in the engaged position.

FIG. 17 is a perspective view of a rack 410 according to a fifth embodiment. The rack 410 includes a single, integrally molded shelf or layer 412 (again, it could alternatively be formed in halves, as in the first several embodiments). Referring to FIG. 18, a cover 417 above each pair of bays 416 closes a pair of elongated chambers 418 molded into the upper portion of the layer 412 (again upper portion is preferred, but the lower portion could also be used). One expandable wall 419 of each elongated chamber 418 is flexible and expandable, such as by being molded with corrugations. When the cover 417 is secured (via adhesive, welding or other known techniques), each elongated chamber 418, including expandable wall 419 and together with the cover 417, formed the expandable chamber 430 in this embodiment. When pressure inside the expandable chambers 430 is increased, the expandable walls 419 resiliently bear against the bottles 20 as shown in FIG. 20.

Figure 21:
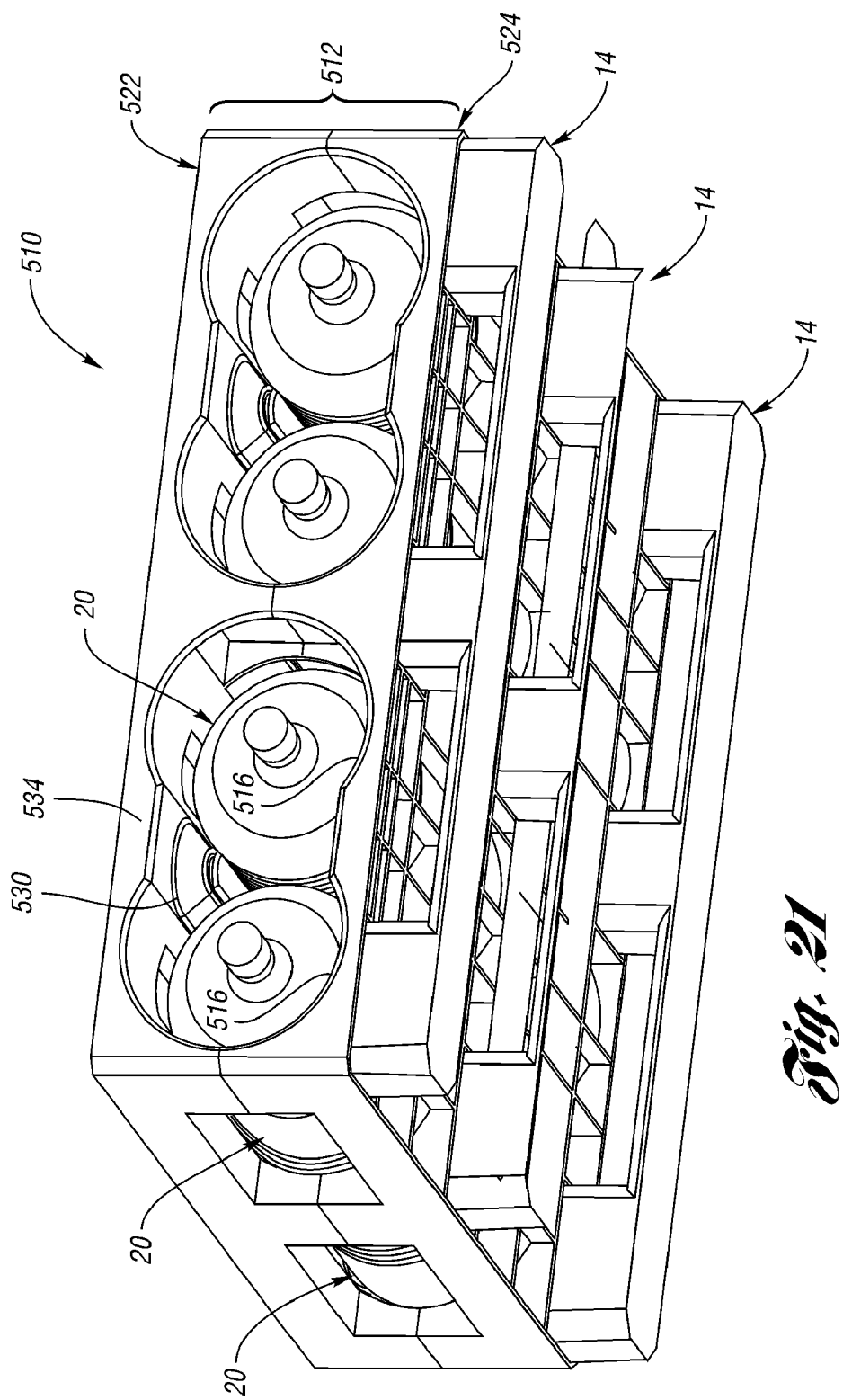
FIG. 21 is a bottom perspective view of a rack according to a sixth embodiment.

FIG. 21 is a bottom perspective view of a rack 510 according to a sixth embodiment. Although only one layer 512 is shown, additional layers 512 would be stacked, as in all the embodiments. In this rack 510, a single expandable chamber 530 winds around through all of the bays 516. Thus, only a single connection to the single expandable chamber 530 is necessary.

Figure 22:
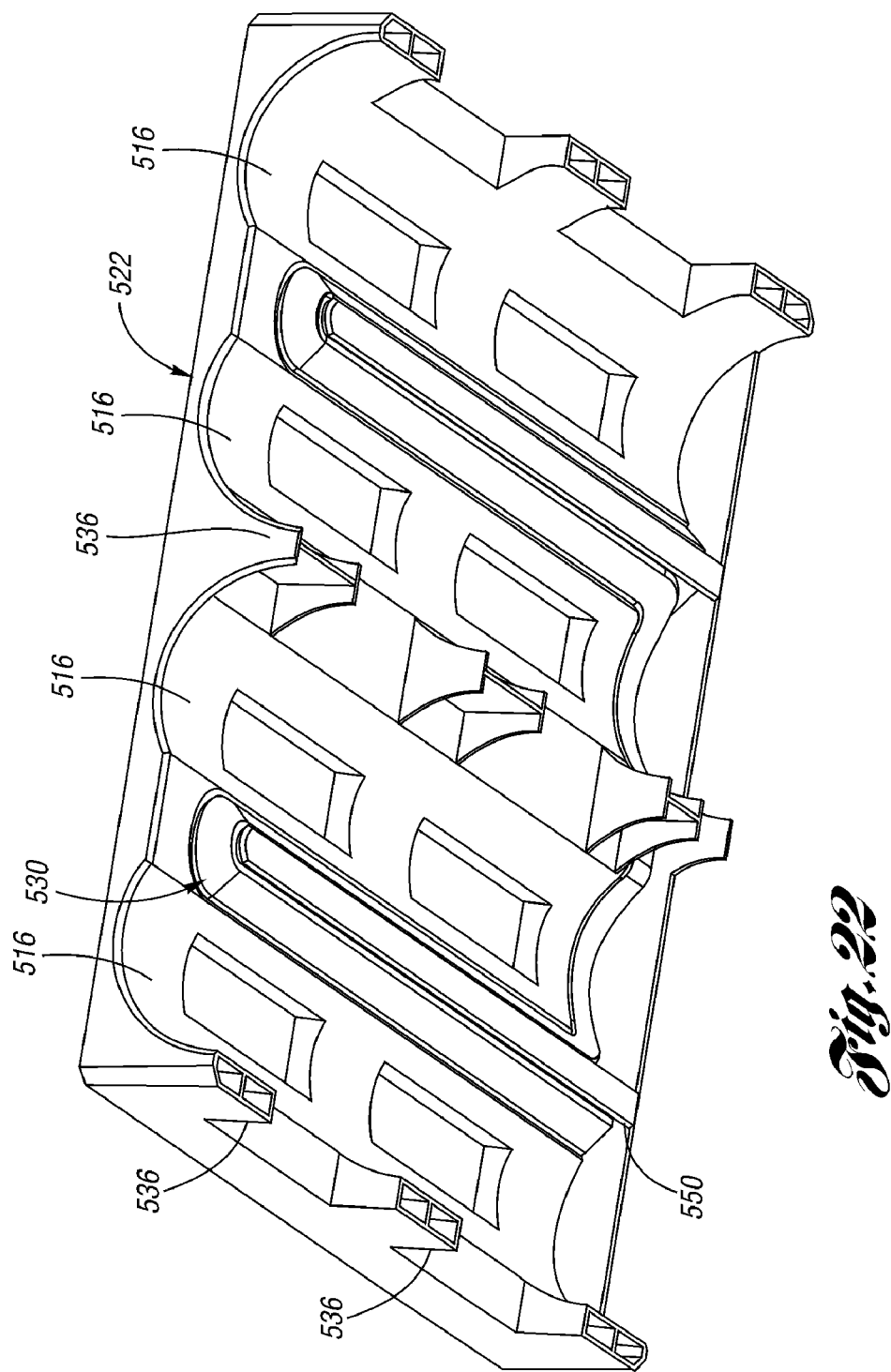
FIG. 22 is a bottom perspective view of the upper section of the rack of FIG. 21.

FIG. 22 is a bottom perspective view of the upper section 522 of the rack 510 of FIG. 21. The expandable chamber 530 winds around through all of the bays 516 in a serpentine pattern, such that the single expandable chamber 530 can contact all of the bottles 20 (FIG. 1).

Figure 23:
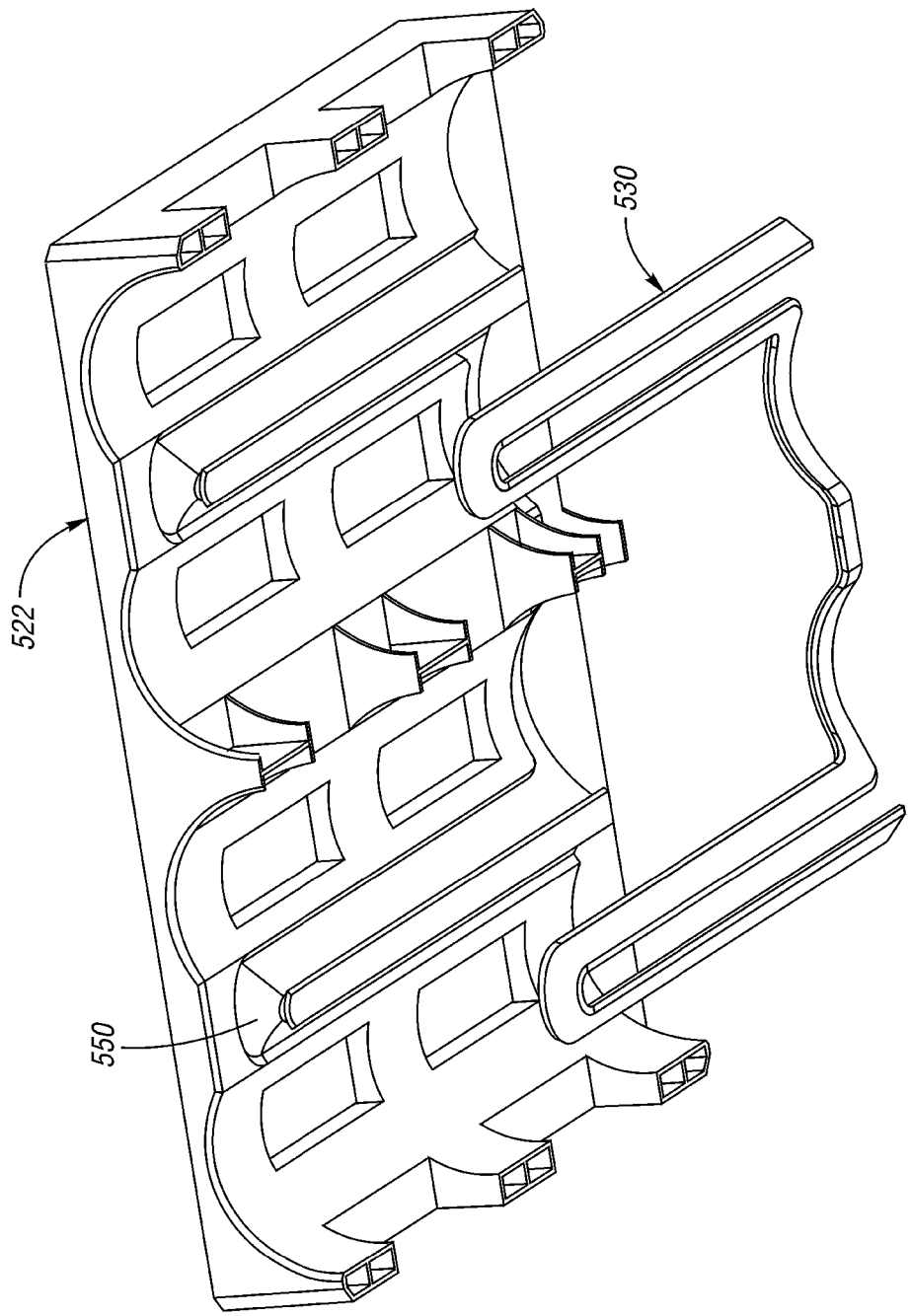
FIG. 23 is an exploded view of the upper section of FIG. 22.
Figure 24:
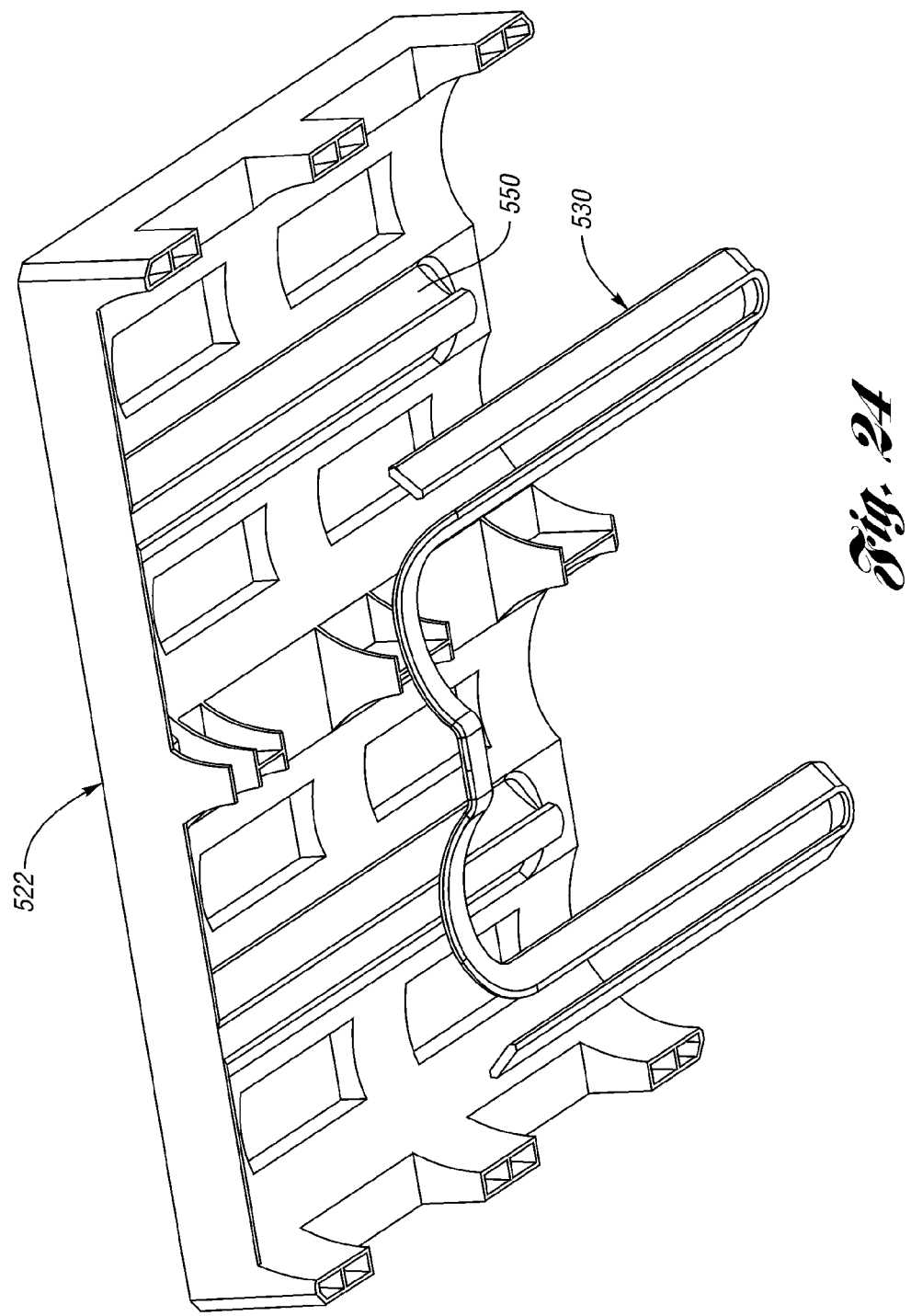
FIG. 24 is a rear view similar to FIG. 23.

FIGS. 23 and 24 are front and rear exploded views, respectively, of the upper section 522. As shown, the mounting area 550 passes through each of the bays 516 at least once, although different patterns could be used.

Although the invention is particularly useful for water bottles 20, other containers and other objects could be secured in a rack in a similar fashion using the invention described above. It should be noted that variations in many of the features between the several embodiments described above are largely interchangeable. For example, the expandable chambers 30, 130, 230, 330, 430, 530 could be directed upwardly, downwardly, horizontally or diagonally against one or more rows of bottles. The layers 12, 112, 212, 312, 412, 512 could be molded as one piece, multiple pieces and could optionally snap together. The invention is not limited to the particular combinations of optional features shown in the several embodiments. It is intended that all of the embodiments shown, or even combinations of several of the embodiments shown could be stacked and used together in the arrangement and system shown in FIG. 7. Suitable expandable chambers 30, 130, 230, 330, 530 are available commercially.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A rack comprising:
    an upper deck and a lower deck between which is defined a plurality of bays including a first bay;
    a first bay for supporting an object; and
    an expandable clamp adjacent the first bay for selectively locking the object in the first bay, wherein the expandable clamp is secured to one of the upper deck and the lower deck and includes an inflatable, expandable chamber.

2. The rack of claim 1 wherein the expandable clamp is inflatable.

3. The rack of claim 2 wherein the expandable clamp includes an inflatable, expandable chamber.

4. The rack of claim 3 wherein the first bay extends longitudinally from a front opening to a rear end and wherein the expandable chamber extends longitudinally along at least a portion of the first bay.

5. A rack comprising:
an upper deck and a lower deck between which is defined a plurality of bays including a first bay;
a first bay for supporting an object;
an expandable clamp adjacent the first bay for selectively locking the object in the first bay; and
a divider between the first bay and an adjacent one of the plurality of bays, the expandable clamp mounted to the divider.

6. The rack of claim 5 wherein the expandable clamp expands into both the first bay and the adjacent bay when expanded.

7. The rack of claim 1 wherein the expandable chamber expands into the plurality of bays when expanded.

8. The rack of claim 1 further including a valve and a pressure source connected to the expandable clamp.

9. The rack of claim 1 further including a plastic deck at least partially defining the plurality of bays.

10. A rack comprising:
a plastic upper deck and a plastic lower deck between which is defined a plurality of bays including a first bay;
a first bay for supporting an object;
an expandable clamp adjacent the first bay for selectively locking the object in the first bay; and
a plurality of plastic support columns extending downwardly from the upper deck.

11. The rack of claim 10 further including a plurality of water bottles in the plurality of bays abutting the expandable clamp.

12. The rack of claim 1 wherein the expandable clamp includes an inflatable expandable chamber and a more rigid clamp member between the inflatable expandable chamber and the first bay.

13. The rack of claim 1 wherein the expandable clamp includes a flexible wall integrally molded with the rack, the flexible wall selectively expanding into the first bay to lock the object in the first bay.

14. The rack of claim 13 wherein the flexible wall expands into the first bay based upon air pressure supplied behind the flexible wall.

15. A rack comprising:
a plastic deck defining a bay for holding an object, wherein the deck includes a divider partially defining the bay; and
an inflatable chamber fixed to the deck adjacent the bay for selectively locking the object in the bay, the inflatable chamber mounted to the divider, the inflatable chamber selectively expandable into the bay upon inflation of the inflatable chamber.

16. The rack of claim 15 wherein the deck is a lower deck, the rack further including a plurality of columns extending upward from the lower deck, the plurality of columns and the divider defining the bay, the bay having a front opening.

17. The rack of claim 16 further including a plurality of containers in the bay, the inflatable chamber inflated such that it clamps the containers in the bay.

18. A rack comprising:
a deck defining a bay for holding an object, wherein the bay is one of a plurality of bays defined by the deck; and
an inflatable chamber fixed to the deck adjacent the bay for selectively locking the object in the bay, the inflatable chamber arranged in a serpentine pattern so that it extends into each of the plurality of bays.

19. A rack comprising:
a bay for supporting an object;
an expandable clamp adjacent the bay for selectively locking the object in the bay;
a valve and a pressure source connected to the expandable clamp; and
a sensor for activating the valve based upon a vehicle operating state.

20. A rack comprising:
a bay for supporting an object;
an expandable clamp adjacent the bay for selectively locking the object in the bay;
a valve and a pressure source connected to the expandable clamp; and
a sensor for activating the valve based upon opening or closing a door.

21. The rack of claim 20 installed on a vehicle wherein the sensor is mounted adjacent the door.

22. The rack of claim 20 further including a plastic deck at least partially defining the bay.

23. The rack of claim 20 further including a plurality of plastic support columns extending downwardly from a deck.

24. The rack of claim 20 further including a plurality of water bottles in the bay abutting the expandable clamp.

25. The rack of claim 1 wherein the expandable chamber is secured to the upper deck, such that the expandable chamber would provide a downward force on the object in the first bay.

26. The rack of claim 1 wherein a second one of the plurality of bays is defined above the upper deck above the first bay.

27. A rack comprising:
a deck defining a bay for holding an object; and
an inflatable chamber fixed to the deck adjacent the bay for selectively locking the object in the bay,
wherein the inflatable chamber is a first inflatable chamber and further including a second inflatable chamber, the rack further including a common conduit for inflating both the first inflatable chamber and the second inflatable chamber.

28. A rack comprising:
a deck defining a bay for holding an object; and
an inflatable chamber fixed to the deck adjacent the bay for selectively locking the object in the bay, further including a coupling secured to the rack and in fluid communication with the inflatable chamber for inflating the inflatable chamber.

* * * * *

UNITED STATES PATENT AND TRADEMARK OFFICE
CERTIFICATE OF CORRECTION

PATENT NO. : 8,100,273 B2
APPLICATION NO. : 11/389949
DATED : January 24, 2012
INVENTOR(S) : William P. Apps Page 1 of 1

It is certified that error appears in the above-identified patent and that said Letters Patent is hereby corrected as shown below:

IN THE CLAIMS:

In column 6, line 53, please delete ";"

In column 6, line 54, please delete "a first bay"

In column 7, line 3, please delete ";"

In column 7, line 4, please delete "a first bay"

In column 7, line 21, please delete ";"

In column 7, line 22, please delete "a first bay"

Signed and Sealed this
Sixth Day of November, 2012

David J. Kappos
*Director of the United States Patent and Trademark Office*